United States Patent
Chen et al.

(10) Patent No.: US 11,580,120 B2
(45) Date of Patent: *Feb. 14, 2023

(54) METHODS AND APPARATUS FOR DETERMINING A MOOD PROFILE ASSOCIATED WITH MEDIA DATA

(71) Applicant: Gracenote, Inc., Emeryville, CA (US)

(72) Inventors: Ching-Wei Chen, Oakland, CA (US); Kyogu Lee, Albany, CA (US); Peter C. DiMaria, Berkeley, CA (US); Markus K. Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,498

(22) Filed: Nov. 12, 2021

(65) Prior Publication Data
US 2022/0067057 A1    Mar. 3, 2022

Related U.S. Application Data

(63) Continuation of application No. 16/685,281, filed on Nov. 15, 2019, now Pat. No. 11,204,930, which is a
(Continued)

(51) Int. Cl.
G06F 16/30        (2019.01)
G06F 16/2457      (2019.01)
(Continued)

(52) U.S. Cl.
CPC .... G06F 16/24578 (2019.01); G06F 16/4387 (2019.01); G10H 1/0008 (2013.01); *G10H 2240/085* (2013.01); *G10H 2240/131* (2013.01)

(58) Field of Classification Search
CPC .......... G06F 16/24578; G06F 16/4387; G06F 16/683; G06F 16/68; G06F 16/634; G06F 16/95; G06F 16/90335
(Continued)

(56) References Cited

U.S. PATENT DOCUMENTS 5,918,223 A    6/1999  Blum et al.
6,505,160 B1   1/2003  Levy et al.
(Continued)

FOREIGN PATENT DOCUMENTS

EP        1197020 B1    11/2007
WO     2002084640 A2    10/2002
(Continued)

OTHER PUBLICATIONS

Chen, et al., "Improving Perceived Tempo Estimation by Statistical Modeling of Higer-Level Musical Descriptors," Audio Enginering Society Convention Paper, 8 pages, 2009.
(Continued)

*Primary Examiner* — Sana A Al-Hashemi
(74) *Attorney, Agent, or Firm* — McDonnell Boehnen Hulbert & Berghoff LLP

(57) ABSTRACT

Examples described herein may perform various operations based on mood congruency. An example method involves accessing, by a processor, from a database, a score that represents a degree of congruency between a first mood vector that describes first media data and a second mood vector that describes second media data, wherein the score is generated based on (i) a first value that the first mood vector associates with a first mood, (ii) a second value that the second mood vector associates with a second mood, and (iii) a degree of congruency between the first and second moods, based on the score, comparing, by the processor, a first characteristic of the first media data, other than the first mood, with a second characteristic of the second media data, other than the second mood, and based at least in part on an output of the comparing, providing an indicator to a module.

20 Claims, 12 Drawing Sheets

Related U.S. Application Data continuation of application No. 15/807,378, filed on Nov. 8, 2017, now Pat. No. 10,558,674, which is a continuation of application No. 14/312,007, filed on Jun. 23, 2014, now Pat. No. 9,842,146, which is a continuation of application No. 12/489,861, filed on Jun. 23, 2009, now Pat. No. 8,805,854.

(51) Int. Cl.
*G06F 16/438* (2019.01)
*G10H 1/00* (2006.01)

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 6,539,395 B1* | 3/2003 | Gjerdingen | G06F 16/68 707/999.102 |
| 6,545,209 B1 | 4/2003 | Flannery et al. | |
| 6,829,368 B2 | 12/2004 | Meyer et al. | |
| 6,941,275 B1 | 9/2005 | Swierczek | |
| 6,993,532 B1 | 1/2006 | Platt et al. | |
| 7,243,104 B2 | 7/2007 | Bill | |
| 7,302,574 B2 | 11/2007 | Conwell et al. | |
| 7,349,552 B2 | 3/2008 | Levy et al. | |
| 7,415,129 B2 | 8/2008 | Rhoads | |
| 7,461,136 B2 | 12/2008 | Rhoads | |
| 7,587,602 B2 | 9/2009 | Rhoads | |
| 7,590,259 B2 | 9/2009 | Levy et al. | |
| 8,015,186 B2* | 9/2011 | Kobayashi | G06F 16/90335 707/736 |
| 8,071,869 B2 | 12/2011 | Chen et al. | |
| 8,326,584 B1* | 12/2012 | Wells | G06F 16/433 703/2 |
| 8,805,854 B2 | 8/2014 | Chen et al. | |
| 2002/0018074 A1 | 2/2002 | Buil et al. | |
| 2003/0205124 A1 | 11/2003 | Foote et al. | |
| 2004/0068401 A1 | 4/2004 | Herre et al. | |
| 2004/0083232 A1 | 4/2004 | Ronnewinkel et al. | |
| 2005/0217463 A1 | 10/2005 | Kobayashi | |
| 2006/0277171 A1 | 12/2006 | Ellis et al. | |
| 2007/0089057 A1 | 4/2007 | Kingdig et al. | |
| 2007/0174274 A1* | 7/2007 | Kim | G06F 16/634 707/999.005 |
| 2008/0188964 A1 | 8/2008 | Bech et al. | |
| 2008/0215979 A1 | 8/2008 | Clifton et al. | |
| 2008/0281590 A1 | 9/2008 | Breebaart et al. | |
| 2009/0006397 A1 | 1/2009 | Lehtiniemi | |
| 2009/0063414 A1 | 1/2009 | White et al. | |
| 2009/0069914 A1 | 3/2009 | Kemp et al. | |
| 2009/0071316 A1 | 3/2009 | Oppenheimer | |
| 2009/0139389 A1 | 6/2009 | Bowen | |
| 2009/0249945 A1 | 10/2009 | Yamashia et al. | |
| 2010/0138427 A1* | 6/2010 | Van De Par | G06F 16/683 707/E17.014 |
| 2010/0282045 A1 | 11/2010 | Chen et al. | |
| 2013/0067348 A1* | 3/2013 | Kast | G06F 16/95 715/747 |

FOREIGN PATENT DOCUMENTS

| | | |
|---|---|---|
| WO | 2005106877 A1 | 11/2005 |
| WO | 2010129693 A1 | 11/2010 |
| WO | 2010151421 A1 | 12/2010 |

OTHER PUBLICATIONS

Davies, et al., "Exploring the effect of rhythmic style classification on automatic tempo estimation," Proc European Signal Processing Conf, Retrieved from the Internet: URL:http://www.elec.qmul.ac.uk/markp/2008/DaviesPlumbley08-exploring.pdf, 5 pages, 2008.

International Application Serial No. PCT/US2010/033753, International Preliminary Report on Patentability dated Nov. 17, 2011, 9 pages.

U.S. Appl. No. 12/436,718, Response filed Jun. 29, 2011 to Non-final Office Action dated Apr. 13, 2011, 10 pages.

U.S. Appl. No. 12/436,718, Response to Restriction Requirement dated Jan. 20, 2011, 6 pages.

U.S. Appl. No. 12/436,718, Restriction Requirement dated Jan. 20, 2011, 6 pages.

U.S. Appl. No. 12/489,861, Amendment Under 37 C.F.R. filed Jun. 26, 2014 to Notice of Allowance dated Mar. 28, 2014, 10 pages.

U.S. Appl. No. 12/489,861, Final Office Action dated Jan. 23, 2012, 33 pages.

U.S. Appl. No. 12/489,861, Non-final Office Action dated Jul. 13, 2011, 22 pages.

U.S. Appl. No. 12/489,861, Notice of Allowance dated Mar. 28, 2014, 18 pages.

U.S. Appl. No. 12/489,861, PTO Response to Rule 312 Communication dated Jul. 15, 2014, 2 pages.

U.S. Appl. No. 12/489,861, Response filed Apr. 10, 2012 to Final Office Action dated Jan. 23, 2012, 18 pages.

U.S. Appl. No. 12/489,861, Response filed Oct. 6, 2011 to Non-Final Office Action dated Jul. 13, 2011, 21 pages.

International Application Serial No. PCT/US2010/033753, Search Report dated Oct. 15, 2010, 8 pages.

International Application Serial No. PCT/US2010/033753, Written Opinion dated Oct. 15, 2010, 7 pages.

International Application Serial No. PCT/US2010/037665, International Preliminary Reporton Patentability dated Jan. 12, 2012, 7 pages.

International Application Serial No. PCT/US2010/037665, Search Report dated Sep. 15, 2010, 18 pages.

International Application Serial No. PCT/US2010/037665, Written Opinion dated Sep. 15, 2010, 18 pages.

Laurier, et al., Multimodal Music Mood Classification using Audio and Lyrics, Seventh International Conference on Machine Learning and Applications, Conference Paper, pp. 689-693 2008.

Linxing, et al., "Using Astatistic Model To Capture the Association Between Timbre and Perceived Tempo," Retrieved from the Inernet; URL:http://ismir2008.ismir.net/papers/ISMI R2008_231.pdf, pp. 659-662, 2008.

Schuller, et al., "Tango or Waltz? Putting Ballroom Dance Style into Tempo Detection," Eurasip Journal on Audio Speech and Music Processing, ISSN 1687-4714 001: 001: 10.115/2008/846135, 12 pages, 2008.

U.S. Appl. No. 12/436,718, Non-final Office Action dated Apr. 13, 2011, 8 pages.

U.S. Appl. No. 12/436,718, Notice of Allowance dated Jul. 25, 2011, 8 pages.

U.S. Appl. No. 12/436,718, Notice of Allowance dated Aug. 25, 2011, 9 pages.

* cited by examiner

| Mood Categories | M1 | M2 | M3 | ... | ... | M(n-1) | M(n) |
|---|---|---|---|---|---|---|---|
| M1 | 10 | XX | XX | XX | XX | XX | XX |
| M2 | (10) | 10 | XX | XX | XX | XX | XX |
| M3 | 1 | 8 | 10 | XX | XX | XX | XX |
| ... | 4 | 5 | 8 | 10 | XX | XX | XX |
| ... | 4 | (5) | 5 | 9 | 10 | XX | XX |
| M(n-1) | 3 | (7) | 8 | (4) | 9 | 10 | XX |
| M(n) | 2 | 3 | 4 | 5 | (3) | 7 | 10 |

*FIG. 5A*

METHODS AND APPARATUS FOR DETERMINING A MOOD PROFILE ASSOCIATED WITH MEDIA DATA

RELATED APPLICATIONS

This application is a continuation of U.S. patent application Ser. No. 16/685,281 filed on Nov. 15, 2019, which is a continuation of U.S. patent application Ser. No. 15/807,378, filed on Nov. 8, 2017 and issued as U.S. Pat. No. 10,558,674 on Feb. 11, 2020, which is a continuation of U.S. patent application Ser. No. 14/312,007, filed on Jun. 23, 2014 and issued as U.S. Pat. No. 9,842,146 on Dec. 12, 2017, which is a continuation of U.S. patent application Ser. No. 12/489,861, filed Jun. 23, 2009 and issued as U.S. Pat. No. 8,805,854 on Aug. 12, 2014, the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Gracenote, Inc. All Rights Reserved.

CROSS-REFERENCE TO RELATED PATENT DOCUMENTS

This application is related to co-pending United States Patent Application entitled, "APPARATUS AND METHOD FOR DETERMINING A PROMINENT TEMPO OF AN AUDIO WORK" Ser. No. 12/436,718, filed May 6, 2009, which is incorporated by reference for all purposes.

TECHNICAL FIELD

The present disclosure relates generally to autonomously determining a mood profile of media data including both audio and visual data, such as an audio recording, digital image, or video recording; more specifically, the present disclosure relates to methods and apparatus for constructing a mood profile for media data and for determining a mood congruency between two or more mood profiles.

BACKGROUND

One way for an end user to manage media data, such as, for example audio recordings, is to classify the recordings across one or more characteristics. Classification of the recording across one or more characteristics provides for efficient categorization, access, retrieval, or use of an audio recording. Conventional characteristics such as genre and release date continue to play an important part in performing these tasks. However, many conventional characteristics often do not provide enough detail and dimension to the description of a recording to perform dynamic tasks such as suggesting, recommending, or matching two similar audio or other recordings.

The "mood" that a user is likely to perceive when experiencing media data, such as visual data (e.g. a digital image), video recording, or audio recording, can be useful when a user seeks to perform dynamic tasks, such as those examples identified above. The mood associated with media data may describe the inherent feeling or emotion of the recording, and/or the feeling or emotion perceived, experienced or evoked in the listener or viewer. For example, a rich mood profile which may be associated with a piece of audio data can be used to find pieces of audio data (e.g. recordings) with congruent moods.

BRIEF DESCRIPTION OF DRAWINGS

Some embodiments are illustrated by way of example and not limitation in the Figures of the accompanying drawings in which:

FIG. 5A illustrates an example mood correlates data matrix depicted in tabular form for comparing mood elements of, and determining mood congruency between, two mood profile digests;

DETAILED DESCRIPTION

Figure 1A:
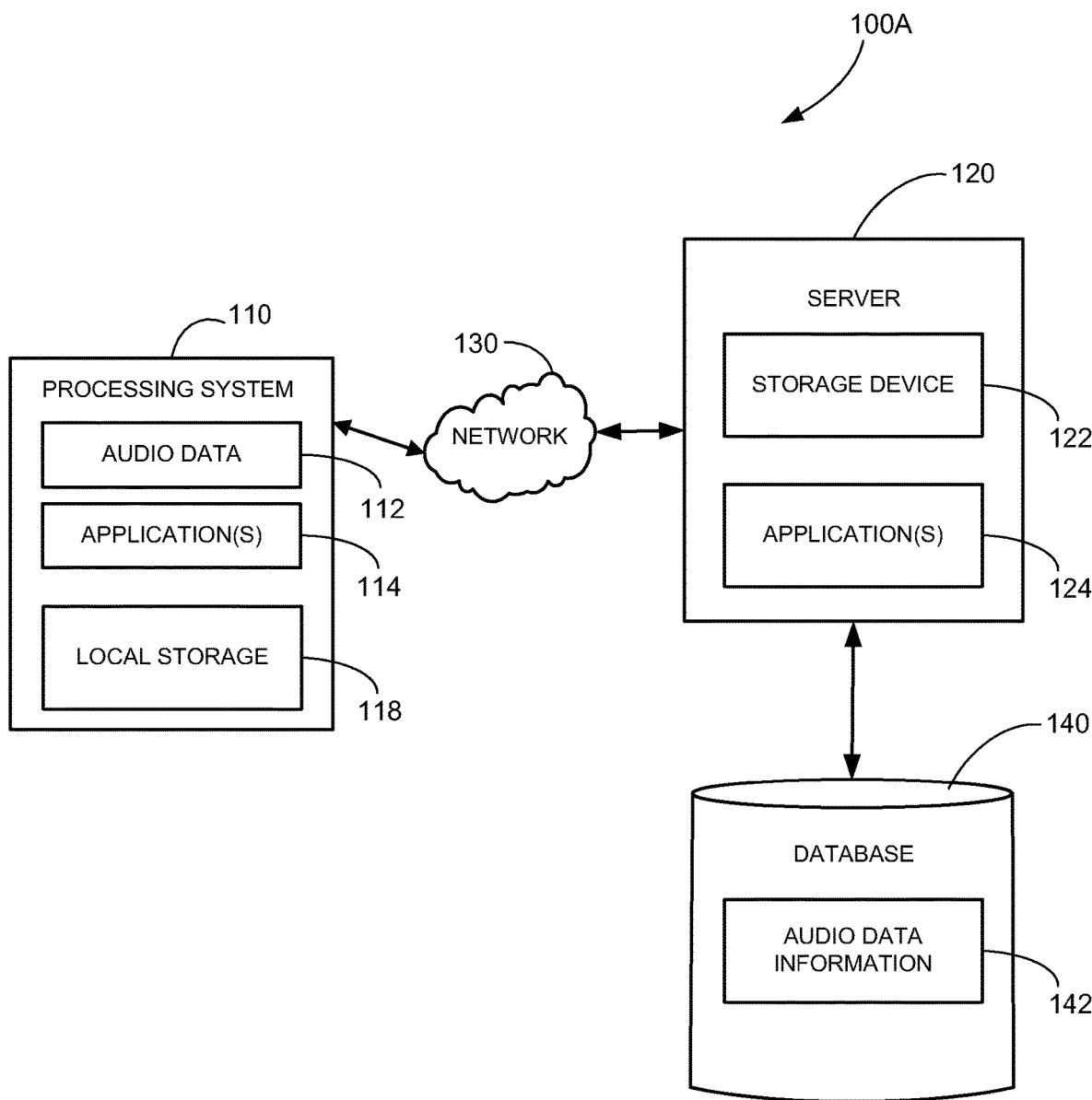
FIG. 1A is a block diagram of a system, in accordance with an example embodiment, to determine a mood profile of audio data and/or determine mood congruency.

Methods and apparatus for determining a mood profile of media information, including audio data and determining a mood congruency are described. The term "mood characteristic" as used herein includes one or more of variables that typically result in a listener having an identifiable emotional perception of, or response to, a media recording such as an image, video or an audio recording. The following detailed description refers to the accompanying drawings that depict various details of examples selected to show how the example embodiments may be practiced. The discussion herein addresses various examples of the inventive subject matter at least partially in reference to these drawings, and describes the depicted embodiments in sufficient detail to enable those skilled in the art to practice the embodiments. Many other embodiments may be utilized for practicing the inventive subject matter other than the illustrative examples discussed herein, and many structural and operational changes in addition to the alternatives specifically discussed herein may be made without departing from the scope of the inventive subject matter.

In example embodiments, moods of audio works such as sound and music recordings in a music collection are identified. The methods described herein may form part of a recommendation engine to recommend other audio recordings having similar moods to a user. A system may include a database with mood profiles of a plurality of audio recording. These mood profiles may be stored and/or used at the server system or at a remote media device to identify congruent or similar audio recordings. However, in view of lower computing capabilities of remote media devices, in an example embodiment, a fewer number of mood categories and related scores associated with a particular music recording may be used by a remote media device to identify audio recordings that are congruent. For example, a server system may identify scores for each of more than 100 different moods associated with one recording. However, of these 100 different mood/score pairs only 10 might be communicated to a remote media device. Mood profiles may be communicated to one or more remote media devices via a network or otherwise provided to the remote media device.

In various other embodiments, a system may include a plurality of media recordings such as digital pictures, images, and video recordings, each recording having an associated mood profile. Similar to the audio recordings, the mood profiles for these media recordings are determined, stored and applied for retrieving, suggesting, sorting and generally managing the media recordings.

The example embodiments and configurations below relate to audio data (e.g. a song recording) to illustrate one of many forms of media data wherein mood profiles may be determined and used. One knowledgeable in the art would be able to adapt the methodologies below relating to audio recordings to other forms of media recordings such as, but not limited to, digital photographs, images, and video recordings.

Referring now to the drawings, FIG. 1A is a block diagram of a system 100A, in accordance with an example embodiment, to determine a mood profile of audio data (e.g., a recording of a song) and/or determining mood congruency (e.g., between two or more recordings).

As can be seen in FIG. 1A, the system 100A includes a processing system 110 in communication with a server 120 via a network 130, wherein the server 120 is in communication with a database 140. In an example embodiment, the server 120 identifies moods associated with a large number of audio recordings (e.g., audio recordings of performances of musical compositions). The processing system 110 may include a subset of these audio recordings and, responsive to communications between the processing system 110 and the server 120, the processing system 110 may receive mood profile information associated with each of the audio recordings (or a subset of the audio recordings) stored on the processing system 110 at local storage 118. This mood information may be stored at the processing system 110 (e.g., a media player) and may then be used to identify audio recordings at the processing system 110 with a congruent or similar mood profile, generate playlists of recordings having similar mood profiles, and so on.

The processing system 110 may be any media-rendering device (e.g., a portable media player such as an iPod™, a personal computer, mobile phone, vehicle audio system, or the like) that executes one or more applications 114 (e.g., a media player) to process or play audio data 112 (e.g., audio data representing a plurality of recordings in a music collection stored locally at local storage 118 or streamed or otherwise delivered from server 120). The processing system 110 or the server 120 may store mood data that identifies a mood profile of the recordings stored on the processing system 110 or the server 120. In some example embodiments, the one or more applications 114 or 124 may determine the mood congruency between at least a portion of two mood profiles, each mood profile being associated with a piece of audio data (e.g., a musical recording). Although certain functionality may be divided between multiple applications in some examples, for clarity and merely by way of example, the present discussion will address the functionality as being performed by a single application 114 executed at the processing system 110.

In an example embodiment, the application 114, when executed on the processing system 110, may suggest, sort, manage, and/or create a playlist of audio recordings from the audio data 112 (e.g., plurality of songs)compiled or populated in reference to the determined mood profiles and optionally, other attributes and data. As an abstraction, the application 114 may be organized and executable in any manner considered useful to facilitate determining the mood profile of the audio data 112 and to use any portion of the mood profile for various functions.

When executing the application 114 (e.g., a media player), the processing system 110 may retrieve or access information (e.g., mood information of recordings provided in a music library resident on the processing system 110 or the server 120) from the server 120 or a local database residing on the processing system 110 or the database 140 that may then be used to process the audio data 112. The processing system 110 may also submit information determined at the processing system 110. For example, the processing system 110 extract and send low-level audio feature data to the server 120 which may then process the data to identify mood information related to music recordings represented by the feature data. For example, the server 120 may determine mood characteristics of music recordings represented by the audio data 112. In an example embodiment, the processing system 110 may send media identifiers that identify all media items stored in a media library at the processing system 110.

In some example embodiments, the determination of whether a mood profile has already been calculated may be performed by use of an identifier associated with the audio data 112. In the embodiment, the application 114 uses the identifier, (e.g., a fingerprint or text matching) to look-up a previously-generated or calculated mood profile stored either locally at the processing device 110 or remotely at another processing device 110 or server 120. In the example embodiment, the processing system 110 thereby avoids duplicative efforts and calculations in determining a mood profile.

The application 114 may provide functionality for an end user to process the audio data 112 allowing the end user to play, stop, pause, order, record, sort, search, etc., the audio data 112. As will be apparent to those skilled in the art, this functionality may be provided by the same application that determines a mood profile and/or determines mood congruency, or may be provided by a separate application, such as a conventional media player application (e.g., iTunes™, Windows Media Player™ or the like).

In example embodiments, the determined mood profile may be used in various functions of the application 114 to sort, manage, search, organize, find, retrieve, generate a playlist, recommend, and/or access audio data as well as support personalization and social networking functionality via the generation of music preference profiles. In some example embodiments, all or a portion of the mood profile of one piece of audio data may be compared to all or a portion of the mood profile of another piece of audio data to determine the degree, if any, of "mood congruency" or mood similarity. In an example embodiment, the mood profile of audio data is a descriptive representation of mood across various mood categories. Each mood category may be represented by a numerical value. A mood congruency may identify one or more similarities between at least a portion of two or more mood profiles.

The application 114 may define all, a portion, or summarization of mood profiles to be used when making a mood congruency determination. These mood profile digests may be deemed "congruent" when they exceed a threshold level of similarity. In example embodiments, the mood profile digest may be a single mood category and associated score or may be a plurality of mood categories and associated scores. In an example embodiment, a similarity score summarizing the relationship of the two compared mood profile digests is compared to a threshold value (see, for example, FIG. 5B defining values for threshold cutoffs). In some example embodiments, the threshold may be set to a numerical value. In other example embodiments, the threshold may be a range of values for which audio recordings (e.g. songs) may be deemed "congruent" if the similarity score falls within the range. In an example embodiment, the user may be able to set the threshold lower or higher than a default setting established by the application 114, or may widen or narrow a range established by the application 114.

In some embodiments, the end user may create a preferred mood profile using an interface provided by the application 114. The application 114 may then determine a mood congruency between all (or a portion) of the preferred mood profile and all (or a portion) of other mood profiles associated with a piece of audio data. The application 114 may then display, play or recommend one or more mood-congruent pieces of audio data to the user. In another example embodiment, all (or a portion) of one user's preferred mood profile may be compared to all (or a portion) of one or more other users' preferred mood profiles to determine mood congruency, the result of which may be used to suggest one or more pieces of audio data, other content, or other users to any user. Comparisons of different users' mood profiles may be performed at the server 120 or at a user's processing system 110. The creation of user mood preferences may also be based on automated analysis of collection contents, clickstream, listening, or other user behavior.

As mentioned above, the processing system 110 may be any form of processing system, including a media player (portable or otherwise), a vehicle audio system, a personal computer, a mobile telephone, etc., or any combination thereof. In another example embodiment, the various components depicted in the example system 100A may be integrated within a single processing system such as processing system 110 and, accordingly, may not require the network 130 to communicate between the various components. In another embodiment, the functions of the processing system 110 may be performed all (or in part) by a remote server 120 and is not limited to being performed on the processing system 110.

The audio data 112 can include any number of digital audio tracks, songs, picture files with related audio component, or video files with a related audio component. For example, in an example embodiment, the audio data 112 may include digital audio tracks from a compressed storage medium such as compact discs (CDs) and/or digital versatile discs (DVDs) having an audio component. The audio data 112 may include any number of MPEG-1 Audio Layer 3 (MP3) digital audio tracks, advanced audio coding (AAC), MPEG-4 or any other audio files stored through the use of a compression mechanism. Other forms and types of media files are also accommodated by the processing system 110 and the system 100A, when determining mood congruency for other forms of media data or in general. Further, it should be noted that the methods described herein may be performed on a part of the audio data 112 (e.g., a single song or a portion thereof, or a plurality of songs etc.) and not necessarily on all of the accessible audio data 112 (e.g., an entire music library stored on the processing system 110).

In an example embodiment, the server 120 processes audio data to identify mood information of a plurality of music recordings. The server 120 may be networked with a plurality of processing systems similar to the processing system 110. In an example embodiment, the server 120 also provides media identification using digital fingerprinting techniques.

The server 120 is shown to comprise a storage device 122 and one or more applications 124. The server 120 may include an extensive database of media profiles associated with an extensive number of media recordings (e.g., audio recordings). It is to be noted that the server 120 includes mood profile information but does not necessarily include all the audio data. The server 120 may include identifiers (e.g., digital fingerprints) of these audio recordings to facilitate identification of audio recordings provided on remote devices (e.g., remote media players). As with application(s) 114 of processing system 110, the application(s) 124 may be executable by one or more processors at the server 120 to process the audio data 112 to determine the mood profile of music or other audio data and/or determine mood congruency. Thus, in an example embodiment, the server 120, in combination with the database 140, may provide mood profiles on each of a large number of media recordings. For clarity and merely by way of example, the present discussion will address the described functions as being performed by a single application 124 on the server 120. The server 120 may hold information at the storage device 122 and execute an application 124 to process and manage information stored at the storage device 122 or at the database 140.

In an example embodiment, the mood profiles that have been generated at the individual recording level (e.g., song) may be used to compute aggregated mood profiles that communicated the overall characteristics of albums, playlists, radio stations, recording artists, composers, etc. These aggregate mood profiles may be used in ways similar to the mood profiles associated with a single audio recording (e.g., one song). Additionally, it should be noted that the mood profile or profile elements (e.g., an individual mood category and associated score) may be statistically correlated with other attributes, data, and features of sound recordings. This then enables functionality that may allow a determination of mood profiles based on a probability analysis from other data or vice versa, or compute probability of the similarity of items based on comparing values of mood and another piece of audio data.

The database 140 is shown to comprise audio data information 142, which in various embodiments includes audio data identifiers (e.g., machine-generated fingerprints, table of contents (TOC) or the like) and/or audio data metadata (e.g., which may include one or more names or labels such as composition name, recording artist name, album name; and/or one or more of attributes or profiles such as genre instrumentation, mood, tempo). The audio data identifiers and metadata are associated with audio data 112 and are accessible and retrievable by the processing system 110 and the server 120. The server 120 and/or processing system 110 may use the audio data identifiers to identify audio data 112 when retrieving the mood profile associated with the audio data 112 from the database 140, which can then be used for determining mood congruency and for other functions. In some embodiments, the server 120 and/or processing system 110 may use the audio data metadata (e.g. mood profile) of the audio data information 142 retrieved from the audio database 140 when determining a mood congruency and when performing other functions (e.g., playlist generation). In an embodiment, the mood profile of an extensive library of audio data (of which the audio data 112 may only form a small subset) may be stored in the database 140. In an example embodiment, the audio data information 142 (e.g., identifiers such as fingerprints) is used to retrieve metadata (e.g., mood profiles) when queries are received from the processing system 110 in order to be processed by the application 114.

The system 100A of FIG. 1A may comprise additional servers, processing systems, and databases (not shown) connected and communicating via the network 130. As mentioned above, in an example embodiment, the server 120 may provide mood profiles of audio recordings (e.g., a mood profile for each song or track stored in the database 140) to the processing system 110. An example system and methodology to generate the mood profiles follows.

Figure 1B:
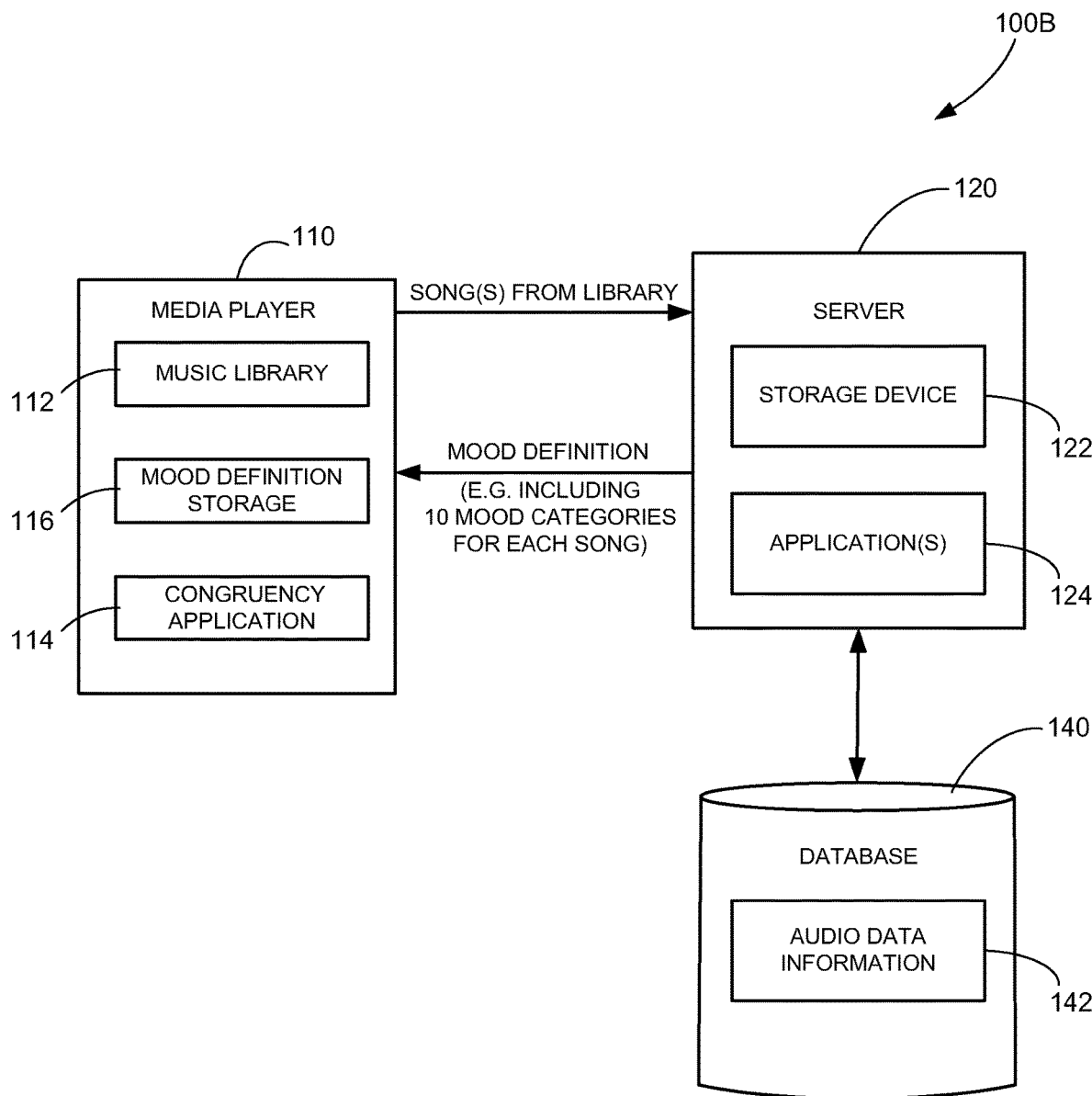
FIG. 1B is a block diagram of a system, in accordance with an example embodiment, to determine a mood profile of audio data and/or determine mood congruency and depicts an example of an exchange of information between various components of the system of FIG. 1A.

FIG. 1B is a block diagram of a system 100B, in accordance with an example embodiment, to determine a mood profile of audio data and/or determine mood congruency. The block diagram also depicts an example of the exchange of information between various components (e.g., the components of the system of FIG. 1A). In the example embodiment, the processing system 110 is shown to be a media player and shown to include audio data 112, which is shown to be a music library, an application 114, which is shown to be a congruency application, and a mood profile digest storage 116.

In the example embodiment, one or more recordings from the audio data 112 (e.g., music library) are communicated to the server 120, wherein an application 124 determines a mood profile for each recording. The mood profile may be stored in the database 140 at audio data information 142 (e.g. mood profile storage). In an example embodiment, the mood profile stored at database 140 is a set of confidence values or scores associated with an elaborate set of mood categories (e.g., 100 or more). In some example embodiments, consideration is given to limitations of processing power and memory allocation at the processing device 110 and the application 114, and therefore, a more compact representation of the full mood profile, referred to as a mood profile digest, may be used instead. In some embodiments, the mood profile digest may be any portion of the mood profile (e.g., 10 highest scoring mood categories) or may include the entire mood profile. The exact portion of the mood profile to be used is defined by such processing and memory limitations as described above. The mood profile digest may be transmitted back to the processing device 110. In some example embodiments, a mood profile digest may be defined by the application 114 (e.g., congruency application) based on the intended use or the above hardware limitations and may be requested by the application 114 at the processing system 110. In some example embodiments, a reduced set of the mood profile (e.g., a mood profile digest) for a piece of audio data (e.g. a song) may be determined at the processing device 110 by an application 114.

In an example embodiment, when the processing system 110 plays or selects one or more recordings, albums and/or artists, the application 114 identifies one or more recordings, albums and or artists from the music library having a congruent mood, by comparing the mood profile digest of the entities currently playing or selected to mood profile digests of one or more entities in the music library 112. In some example embodiments, the user may be able to select a mood category or create a mood profile, mood profile digest, or a mood preference profile independent of a recording and the application 114 will then identify audio recordings in the music library with congruent mood profiles or mood profile digests. In an example embodiment, the application 114 may construct a playlist of recordings with similar mood profiles or mood profile digests identified from the music library. In some example embodiments, the application 114 may consider similarities along one or more other characteristics of the recordings in addition to mood when constructing the playlist.

Figure 1C:
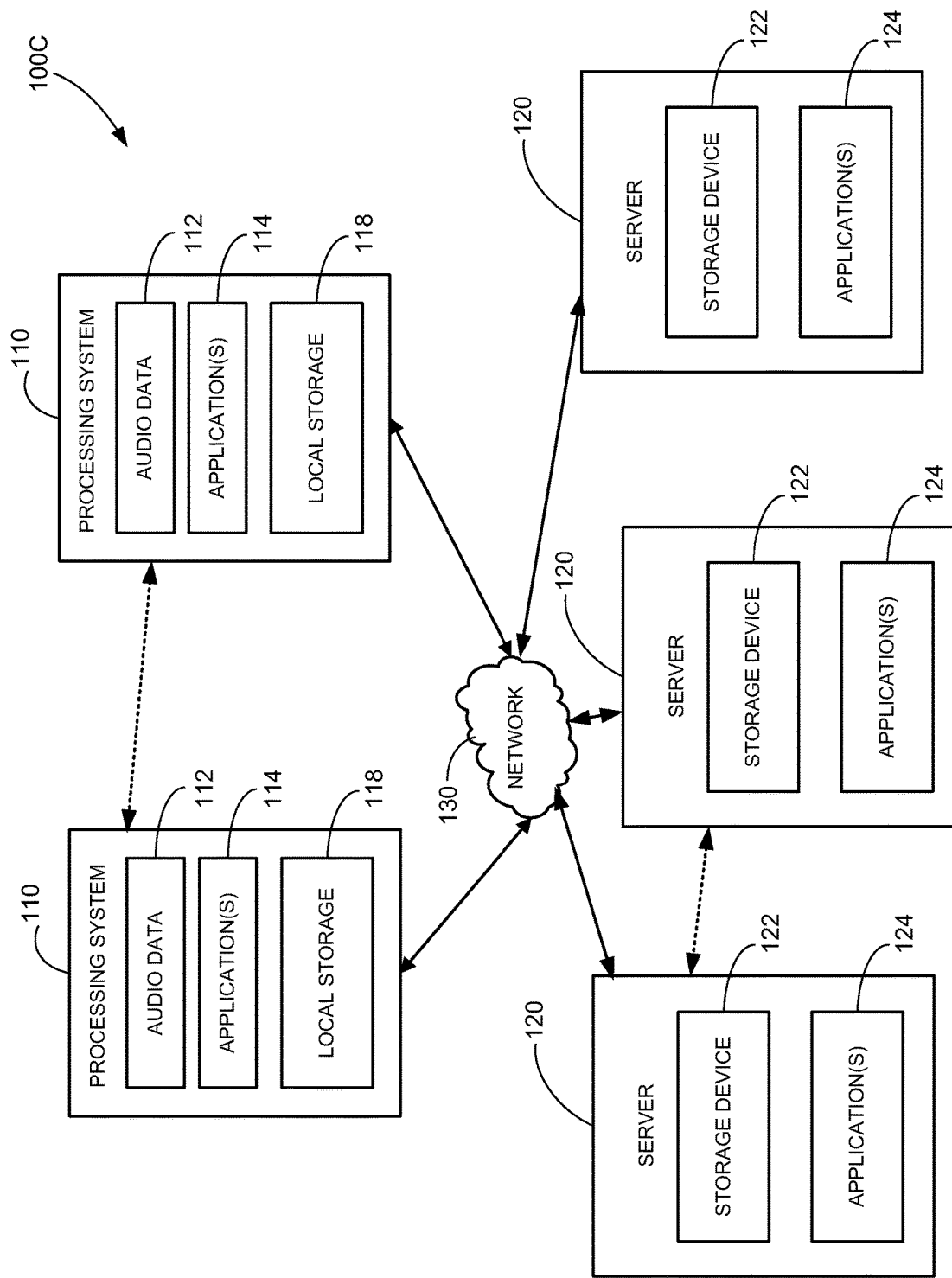
FIG. 1C is a block diagram of a system, in accordance with an example embodiment, for determining a mood profile of audio data and/or for determining mood congruency.

FIG. 1C illustrates a system 100C, in accordance with an example embodiment, to determine mood profiles of audio data, and/or for determining mood congruency. In an embodiment, the system 100C is shown to include a number of processing systems 110 connected by the network 130 to a number of servers 120, in form similar to the processing systems 110 and servers 120 of system 100A and 100B. One or more of the following functions can be performed by a single component or distributed amongst any combination of the following components: 1) a single processing system 110 originating the request to execute the function; 2) one or more processing systems 110, which may include the processing system 110 originating the request to execute the function; and/or 3) one or more servers 120; the functions including a) audio data (e.g. MP3 file, media file, musical recordings) storage; b) digital signal processing (DSP) feature extraction; c) DSP feature analysis, mood profile creation, and score assignment logic; d) storage of resulting audio data information (e.g., mood profile); e) audio playback control; f) music selection, navigation, auto-playlisting and recommendation logic (e.g., "mood congruency application"); g) audio fingerprint generation (e.g., metadata and identifiers); h) audio fingerprint lookup and resulting audio data (e.g., mood profile) retrieval; i) auto-playlist generation, rules for creation, as well as specific result set storage.

Therefore, in example embodiments, a mood profile of an audio recording may be retrieved, accessed, and/or processed by any one or combination of the following methods: i) the mood profile computed directly from features extracted from the user's locally or remotely stored audio recording; ii) the mood profiles computed remotely, associated with an identifier, and retrievable, in whole or in part, when needed by using some recognition method; or iii) a combination of i) and ii).

In one example embodiment, the method described in i) may extract features locally at a processing system 110, and perform the analysis locally at the processing system 110 or at a remote server 120. In another example embodiment, the method described in ii) may retrieve or access a mood profile and/or audio recording from a local embedded database such as the local storage 118, or from a database or storage associated with a remote server 120. In either example, the audio recordings (e.g., one or more MP3 files) may be located at the processing device 110, a remote server 120, at another user's processing device 110, or any combination of these. The results of processing the audio data (e.g., the mood profile and/or extracted features of the audio data) may be stored locally at the processing device 110, or may be transmitted to one or more remote servers 120 to support future recognition, lookup, and/or retrieval of the data via method ii). In another example embodiment, the processing system 110 requests and retrieves an entire mood profile located remotely from the processing system 110 (e.g. at one or more processing systems 110 or one or more servers 120) whenever available or possible for recognized audio recordings, and, as a fall back, may perform feature extraction and mood profile creation for those audio recordings for which a mood profile is not available, retrievable or recognizable (e.g., newly released audio recordings or user-originated audio recordings). In some example embodiments, for applications applying the mood profile, such as, for example auto-playlist creation, navigation, and recommendation, these applications may be performed by a processing device 110 or performed remotely at remote server 120 and provide streaming data to a processing device 110.

In some embodiments, audio data may be transmitted between processing systems 110 or between servers 120 without use of the network 130, by various wired and wireless communication methods known to those of ordinary skill in the art.

In various embodiments, one or more characteristics of the audio data may be used when constructing a playlist of songs. In an example embodiment, the mood profile, the genre, and/or the tempo among other characteristics may be collaboratively applied when constructing the playlist. In some example embodiments, the user may rank the importance of each characteristic or it may be determined automatically and the playlist generator may select songs accordingly. In some embodiments, the songs may be ranked based on the similarities of characteristics to a seed song.

Figures 2A, 2B:
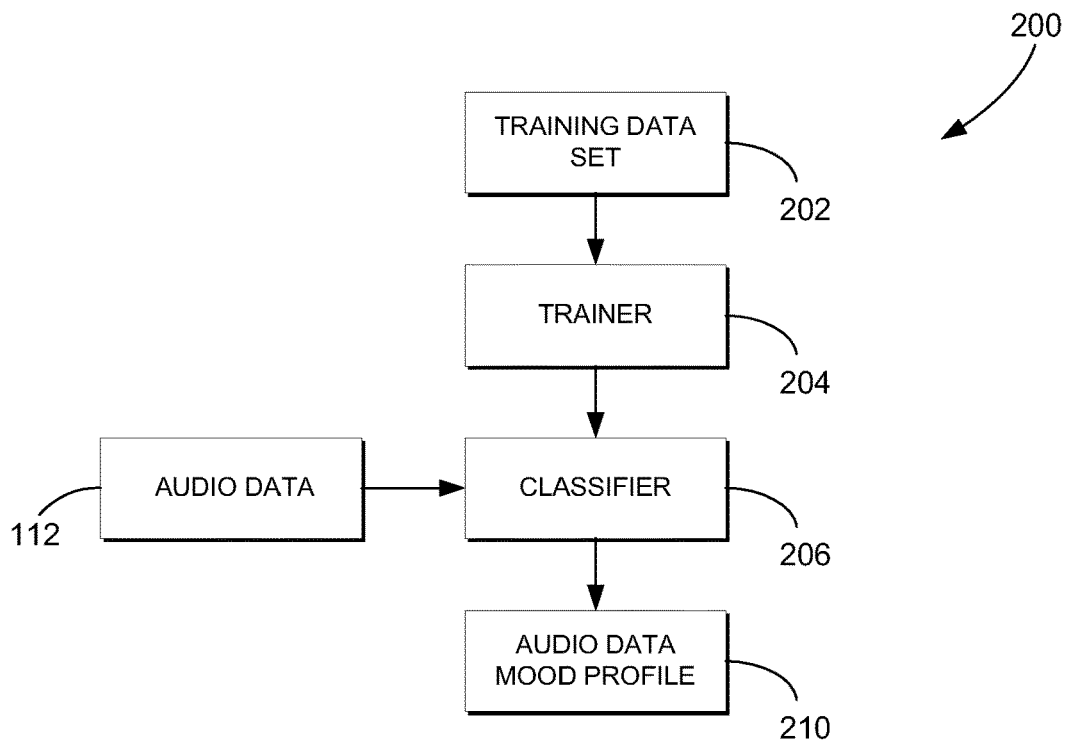
FIG. 2A is an example flow diagram of a method, in accordance with an example embodiment, for generating a mood profile.
FIG. 2B illustrates an example of a mood profile table to store mood profiles.

FIG. 2A is an example flow diagram of a method 200, in accordance with an example embodiment, for determining a mood profile of the audio data. The method 200 may be performed by the server 120 (but could also be performed at least in part by the processing system 110).

In the method 200, the low- and mid-level features are extracted by known digital signal processing (DSP) methods and extract features such as mel-frequency cepstral coefficients (MFCC), spectral flatness, mean value, zero crossings, spectral centroid, chord class, and percussiveness, among other extractable features known in the art. Various digital signal processing feature extraction methods and standards (e.g. MPEG-7) known in the art may be utilized. The resulting features are useable to perform comparative analyses. These features of the audio data (e.g., audio data stored in the database 142 of FIG. 1A or 1B) are compared at a trained mood classifier 206. In an example embodiment, a first set ("training set") of data is used to establish reference standards ("mood classification models") relative to identified criteria, and those mood classification models are then used for evaluating mood of the audio data. In the example embodiment, a training set of data 202 comprises one or more audio files (e.g. a recording of a musical composition) and a set of editorially formed mood profiles corresponding to each of the one or more audio files. For example, in an example embodiment, the mood profiles for the training data set 202 are defined by one or more persons or aggregated from many persons who evaluate each recording and select, rank, or score one or more mood categories for that recording. In other example embodiments, the mood profile for the training set may be generated from analysis of aggregated end-user and/or editorially-generated tags or prose associated with the content, or other data mining methods applied to data sets whose origin may be independent of the training process. The editorially formed mood profiles are shown by way of example to have 'n' mood categories, where 'n' is an integer equal to or greater than 1. Examples of editorially formed mood categories include "sentimental", "somber", "melancholy", "eerie", "happy", "relaxed", "hopeful", and so on. In some example embodiments, many granular, editorial-formed mood categories may be mapped to broader, more inclusive, mood categories thereby requiring less memory and processing to perform both the classifier training and a mood congruency analysis.

Audio files for the training data set 202 may be randomly selected or may be hand-picked to provide adequate dimension and granularity across the 'n' mood categories when determining a mood profile of the audio data at the classifier 206. A trainer 204 receives the training data set 202. At the trainer 204, the one or more audio files of the training data set 202 are decoded and analyzed to extract low- and mid-level features. In an example embodiment, these extracted features are evaluated against and correlated with the editorially assigned mood categories to create 'n' number of mood classification models, one for each of the 'n' mood categories. Accordingly, in this example embodiment, each mood classification model is a correlation set of a mood category with extracted features typical of that mood category. The trainer 204 then submits these mood classification models to the classifier 206, where the models serve as a basis for comparison and reference standard for determining the mood profile 210 of audio data 112.

The classifier 206 receives the audio data 112 to be evaluated and extracts low- and mid-level features of the audio data 112 for comparison with the model profiles available at the classifier 206. By comparing similarities between the extracted features of the audio data 112 to the features corresponding to the 'n' model profiles, the classifier 206 autonomously populates a mood profile 210 across 'n' mood categories and assigns a value for each mood category based on the similarity. An example of these assigned values is depicted in FIG. 2B. In an example embodiment, the classifier 206 is a Gaussian Mixture Model (GMM)-based classifier capable of establishing the scores across 'n' mood categories to create the mood profile 210. In an embodiment, the mood profile may comprise 100 or more mood categories. Thus, in an example embodiment, the classifier 206 can analyze and identify a mood profile for a large collection of audio recordings using the training audio data (e.g., a plurality of audio recordings having various associated mood profiles).

FIG. 2B illustrates an example of mood profile table 220 to store the mood profile 210 for a portion of the audio data. For example, the mood profile table 220 shown in FIG. 2B may provide a mood profile for a particular recording. Accordingly, further (or larger) mood profile tables 220 may be provided for other audio recordings.

The mood profile table 220 may store the mood profile 210 and, accordingly, may be generated by the method 200. In an example embodiment, the table 220 is populated with a plurality of confidence values or "scores", each score corresponding to a mood category. These confidence values or "scores" are computed from a statistical and/or probability analysis describing the likelihood a person listening to a piece of audio data (e.g. a song) would perceive the particular mood.

The table 220 of FIG. 2B has a first data column 222, which includes the mood categories 226, and a second data column 224, which includes the scores 228, with each score 228 corresponding to a mood category 226. Each score 228 is an evaluation of a corresponding mood category 226 for an associated audio recording. In at least some example embodiments, the evaluation scores 228 provide a basis for comparison and at least partial distinction between the mood categories.

Each mood category 226 and its associated score 228 forms an element 230 of the mood profile of an audio recording represented in the mood profile table 220. One or more (or part of) elements 230 of the mood profile 210 may establish a mood profile digest. In an example embodiment, the mood profile digest may be defined by the applications 114 and/or 124 of FIGS. 1A and/or 1B when determining mood congruency. The mood profile digest is a compact representation of the mood profile, and may be derived from the mood profile using a variety of algorithms. In an example embodiment, the mood category 226 having the highest score defines a primary element of the mood profile 210. The mood profile 210 may also have one or more secondary categories that are assessed with lower scores. Thus, a mood profile digest may be derived from any one or more elements 230 of the mood profile 210. In some example embodiments, the mood profile digest, as established by the application 114 or 124 when determining mood congruency, may consist solely of the primary element or may comprise a subset of mood elements of a mood profile. In an example embodiment, the subset includes the 'n' number of mood elements with the highest associated scores in the mood profile. Another example embodiment uses dimensionality reduction techniques such as principal component analysis (PCA) to reduce the mood profile to a smaller number of magnitudes along dimensions in a reduced meta-mood vector space. When determining mood congruency, a first mood profile digest of a first audio recording, and a second mood profile digest of a second audio recording may have an equal number of elements 230. The number of elements 230 in a mood profile digest may depend upon the preferred or needed granularity for use by an application 114 or 124 and may also be bound by the storage capacity and processing power of processing system 110, server 120, or database 140 (as shown in FIGS. 1A and/or 1B).

In an example embodiment, the mood categories 226 (see the first data column 222) identify moods such as "sensual", "melancholy", or the like. Further example moods M3, M4, through M(n-1), and M(n) may be provided. The second data column 224 contains various scores 228 corresponding to associated mood categories 226. For example, the mood "sensual" is shown to have an assigned score of 99, while the mood "melancholy" is shown to have an assigned a score of 25. Although not fully populated, in the example mood profile 210 defined in the mood profile table 220, the mood "sensual" has the highest score (shown by way of example to be 99) and, accordingly, is thus the primary element of the audio recording. In an example embodiment the mood scores are scaled so that the sum of the mood scores assigned in a mood profile of an associated audio recording add up to 100.

It is to be appreciated that analysis on a particular audio recording may identify a limited number of moods in the audio recording. For example, although there may be a substantial number of reference mood categories (e.g., 100 mood categories), analysis of an audio recording (e.g., a song or audio track) may identify just 12 significant, different moods in the audio recording. In an example embodiment, only a limited number of moods may be associated with a particular audio recording; for example, only the top ten (or fewer) moods may be associated with the particular audio recording. In an example embodiment, selected mood values may be estimated. When mood categories are communicated to a remote media client (e.g., a media client on a media player), only a limited number of identified moods (e.g., ten moods) may be communicated to the remote media client to facilitate processing at the remote media client.

Figure 3:
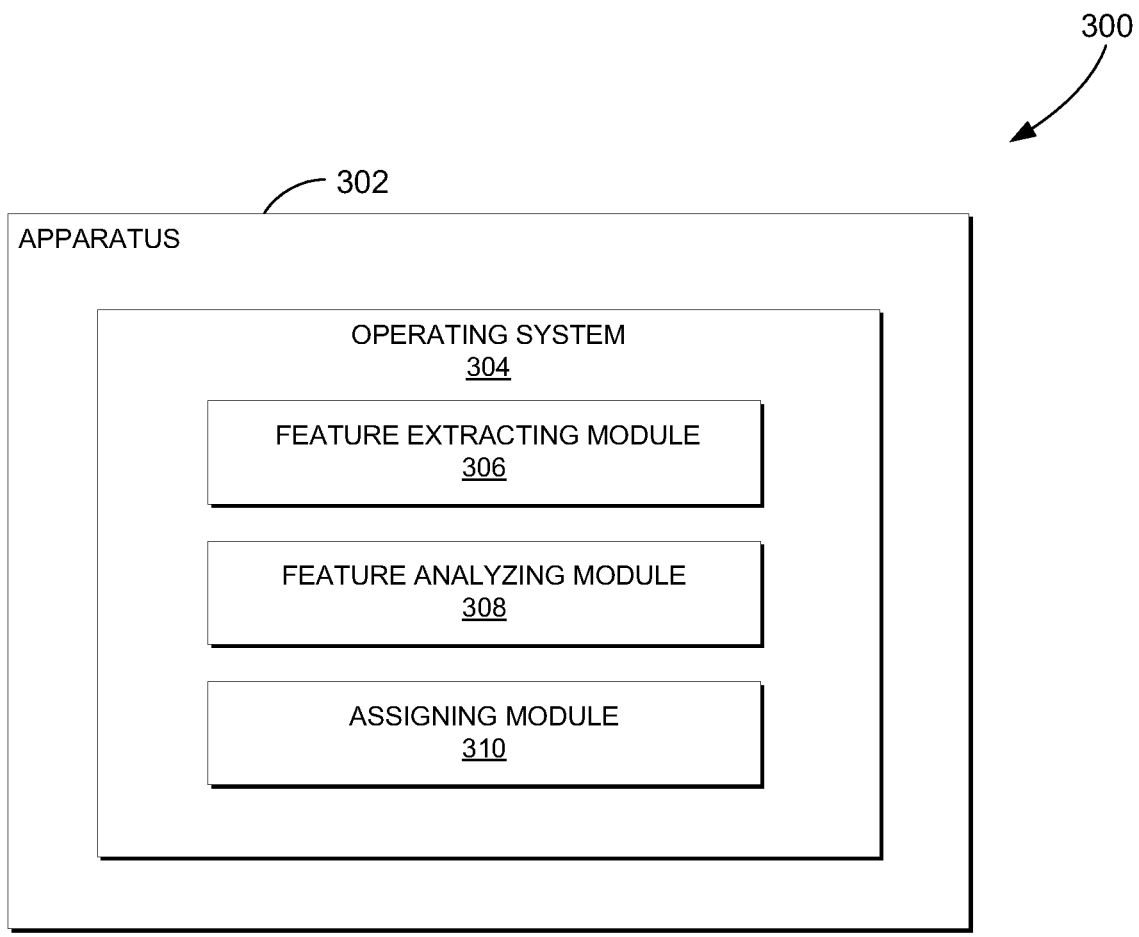
FIG. 3 is a block diagram of modules of an apparatus, in accordance with an example embodiment, configured to determine a mood profile of audio data.

FIG. 3 depicts a block diagram of various modules 300 of an apparatus 302, in accordance with an example embodiment, configured to determine the mood profile of audio recordings (e.g., audio recordings of musical composition) represented by the audio data 112. The apparatus 302 may, for example, form part of the server 120 of FIG. 1A or 1B and perform the method 200 of FIG. 2A. Accordingly, in an example embodiment, the apparatus 302 may perform at least part of the functionality described above with respect to the method 200.

The apparatus 302 is shown to include an operating system 304 facilitating the operation of a plurality of modules. The plurality of modules is also shown to include a feature extracting module 306, a feature analyzing module 308, and an assigning module 310. The feature extracting module 306 extracts a plurality of low- and mid-level features of the audio data 112 as described above in reference to the FIG. 2A. In some example embodiments, the feature extracting module 306 employs known signal processing methods to extract the plurality of features. The feature analyzing module 308 is configured to receive the plurality of low- and mid-level features and compare the features to classification data. In an example embodiment, the classification data is formed in a manner similar to the method 200 described in FIG. 2A by employing the training data set 202, the trainer 204, and the classifier 206, and may also comprise mood classification models for each of the 'n' mood categories, where 'n' is an integer greater than or equal to zero. The assigning module 310 then determines a value based on the comparison of the extracted features to the extracted features associated with the mood classification models across 'n' mood categories. In an embodiment, the resulting mood profile is stored in a tabular form such as the mood profile table 220 depicted in FIG. 2B, or in any useable electronic representation of the correlated mood profile.

It should be appreciated that in other embodiments, the apparatus 302 may include fewer or more modules apart from those shown in FIG. 3. For example, the feature extracting module 306 and the feature analyzing module 308 may be combined into an integrated module configured to extract and analyze features of the audio data 112. The modules 306, 308, and 310 may be in the form of software that is processed by a processor. In another example embodiment, the modules 306, 308, and 310 may be in the form of one or more logic blocks included in a programmable logic device (e.g. a field-programmable gate array). The example modules 306, 308, and 310 may be adapted, and/or additional structures may be provided, to provide alternative or additional functionalities beyond those specifically discussed in reference to FIG. 3. The modifications or additions to the structures described in relation to FIG. 3 to implement these alternative or additional functionalities will be implementable by those skilled in the art, having the benefit of the present specification and teachings.

In an example embodiment, using the mood profile tables (see FIG. 2B) audio data (e.g., audio recordings) may be analyzed to identify audio recordings with a similar (or same) mood. FIGS. 4A, 4B, 6, 7A and 7B, illustrate example methods for comparing and determining a mood congruency between two pieces of audio data (e.g. two recordings). FIG. 5A illustrates a table employed when comparing and determining mood congruency between two pieces of audio data. The methods depicted in FIGS. 4A, 4B, 6, 7A and 7B may be performed at the server 120 and/or at the processing system 110.

Figure 4A:
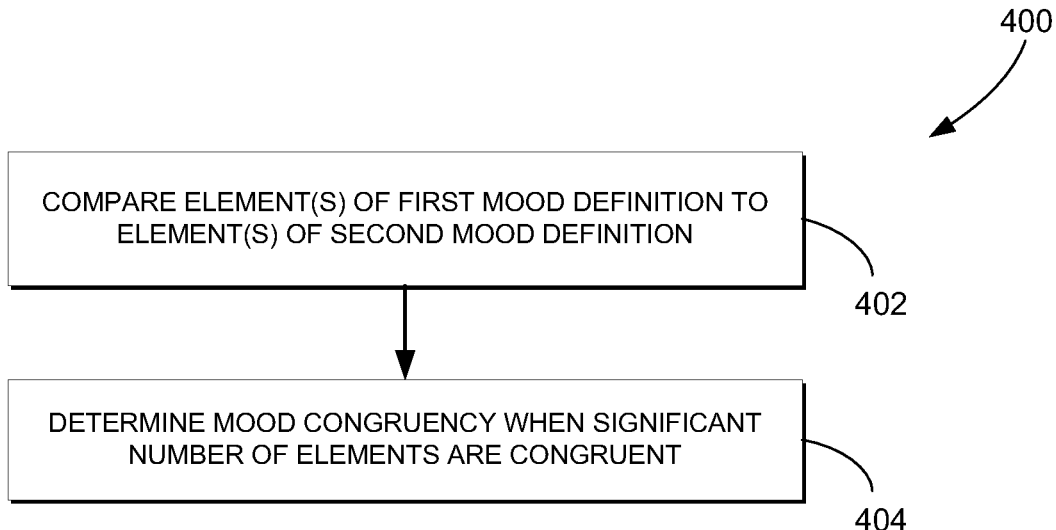
FIG. 4A illustrates a flow diagram of a method, in accordance with an example embodiment, of comparing one or more elements of two mood profile digests when determining mood congruency.

FIG. 4A illustrates a flow diagram of a method 400, in accordance with an example embodiment, for comparing one or more elements of two mood profile digests when determining mood congruency. In an example embodiment, a first mood profile digest from a first mood profile associated with a first piece of audio data (e.g., a first audio recording) is compared to a second mood profile digest from a second mood profile associated with a second piece of audio data (e.g., a second audio recording). Each mood profile comprises one or more elements, with each element including a mood category and a corresponding score (e.g., see mood profile table 220). At block 402, the method 400 compares one or more elements of a first mood profile digest, which may be associated with the first piece of audio data, to one or more elements of a second mood profile digest, which may be associated with a second piece of audio data. Based on the comparison, a mood congruency is determined at block 404. The moods may be considered congruent when a significant number of elements from the first mood profile digest are similar (e.g., substantially similar) to elements from the second mood profile digest. In an example embodiment, the mood profile digest may be selected as the primary element of each mood profile to enhance mood congruency determination or may be calculated to simplify or reduce the determinations or scaling algorithmically. In some example embodiments, the mood profile digest may be a subset of the mood profile elements (e.g. the 10 highest scoring mood elements from each mood profile) when determining the mood congruency. In some example embodiments, the first and second mood profile digests may not contain an equal number of elements when determining mood congruency. In an example embodiment, scores for elements not present in a mood profile digest may be estimated.

Figure 4B:
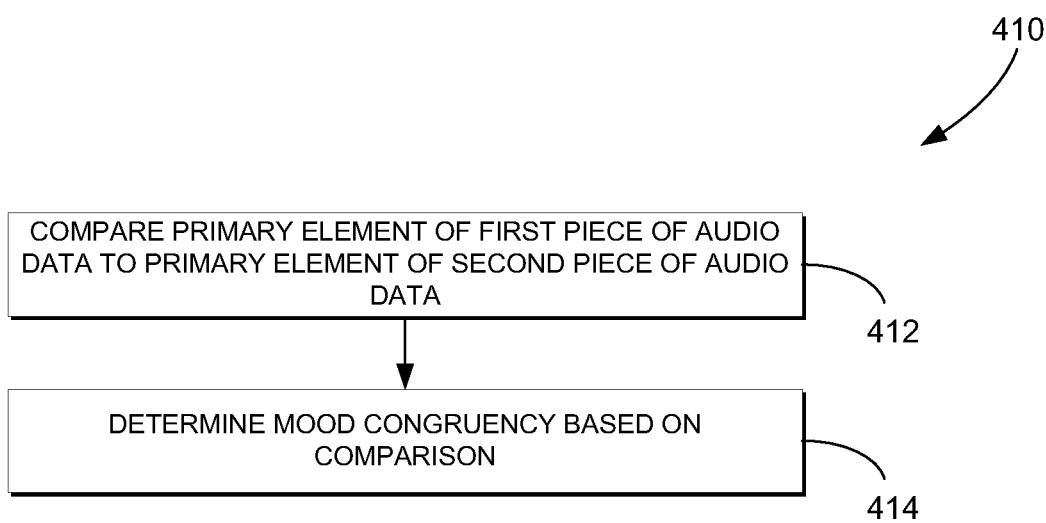
FIG. 4B illustrates a flow diagram of a method, in accordance with an example embodiment, of comparing the primary elements of two pieces of audio data to determine mood congruency.

FIG. 4B illustrates a flow diagram of a method 410, in accordance with an example embodiment, for determining mood congruency when only primary elements of the mood profile digest of two pieces of audio data are used. At block 412, the method 410 compares the primary element of a first piece of audio data to the primary element of a second piece of audio data. In some example embodiments, if both the first and second pieces of audio data have the same mood category for the primary element, the first and second pieces of audio data are deemed to be congruent regardless of assigned score. In other example embodiments, even if both the first and second piece of audio data have the same mood category for the primary element, a numerical comparison of the scores may be performed to determine congruency at block 414. In some example embodiments, a correlates matrix, such as the table 500 depicted in FIG. 5A may be employed when determining mood congruency between primary elements having differing mood categories to normalize the scores and compare the scores to a threshold. In some example embodiments, the method 410 may be performed as a preliminary mood congruency determination in order to assess whether to continue with additional elements of the mood profile digest.

In an example embodiment, the method 410 may compare a user-selected primary element (e.g. a user-selected mood category and user-assigned score) not associated with any audio data, in lieu of comparing the primary elements of two pieces of audio data. In the example embodiment, the user-selected primary element serves to compare and determine congruency with other pieces of audio data. In other example embodiments, the method 410 may automatically select a primary element based on, for example, user selection of music over a course of time. In these example embodiments, the selected primary element is the mood profile digest and is used to find one or more pieces of audio data having a congruent primary element.

FIG. 5A illustrates an example mood correlates data matrix table 500 for comparing mood elements of, and determining mood congruency between, two mood profile digests. In many instances, when comparing two mood profile digests (e.g., as one of many possible examples, the top 10 scoring mood elements for two recordings), the mood categories within the first mood profile digest may not align identically with those of the second mood profile digest. Although the two mood profile digests may not have identical mood categories for comparison, the two mood profile digests may nonetheless be deemed congruent (or be sufficiently similar) for various functions such as, for example, suggesting an audio recording (e.g., an audio track) associated with one of the two mood profile digests to an end user. The number in each cell 506 of the table 500 quantifies a similarity relationship between content belonging to identical and non-identical mood categories. The table 500 may be used to normalize mood scores when performing a mood congruency determination. In some example embodiments, this relationship may be summarized by an integer within a range of values, wherein a greater value indicates a strong similarity between the two mood categories, and a lesser or negative value may indicate a weak similarity, or dissimilarity, between mood categories. In some embodiments, finding tracks of dissimilar moods categories may be the goal of the application, and therefore, determining the least congruent mood profiles, mood profile digest, or mood preference profiles may be performed with the use of table 500 and as described below.

In an example embodiment, the table 500 comprises data columns 502 and data rows 504, the intersections of which are data cells 506. The data columns 502 and the data rows 504 have headings populated with mood categories, and in this example include, M1, M2, M3 . . . M(n–1) and M(n) where 'n' is an integer greater than zero. As an example, M1 may be a 'somber' mood and M2 may be an 'angry' mood, and so on. In an example embodiment, the cells 506 contain a comparative value, for example a numerical score or ranking, exemplifying the similarity between intersecting mood categories. As depicted in table 500, each cell 506 contains a comparative value which falls within a set range of values, such as, for example, "–10" (show as "(10)") and "10" to create a gradient of very similar to very dissimilar (e.g. a range of 10 to –10) moods. For example, a very strong similarity between a mood category of column 502 and a mood category of row 504 receives a higher positive value "10" to indicate the similarity. A very strong dissimilarity between mood categories may receive a lower negative score, for example, a "–10". Mood categories which are neither similar nor dissimilar to each other may receive a score with a smaller absolute value, for example a "0".

In an example embodiment, the values in the cells 506 may be editorially assigned. For example, in some embodiments, one or more persons may evaluate each relationship between moods and assign the comparative value for each cell 506. In another example embodiment, an average value given to a relationship derived from multiple users inputting values may be used to populate each cell 506. In some example embodiments, a standard deviation may be taken into consideration to avoid significant disparity among assignments when using averages across multiple users to populate the cells. In another example embodiment, the relationship between mood categories (e.g. each comparative value) may be determined by an automated comparison of model mood profiles for each of the 'n' moods, such as those derived at a classifier 206 as described above in reference to FIG. 2A. Some cells 506 of table 500 may not be populated with a score to avoid redundancies and reduce inefficient processing and memory allocation when populating, using and/or storing the table 500.

As described above, the scale may be transformed to whatever scale and range is optimal for the implementation. In some example embodiments, fewer mood categories may be used to reduce processing and memory consumption when performing a mood congruency determination.

Figures 5B, 5C:
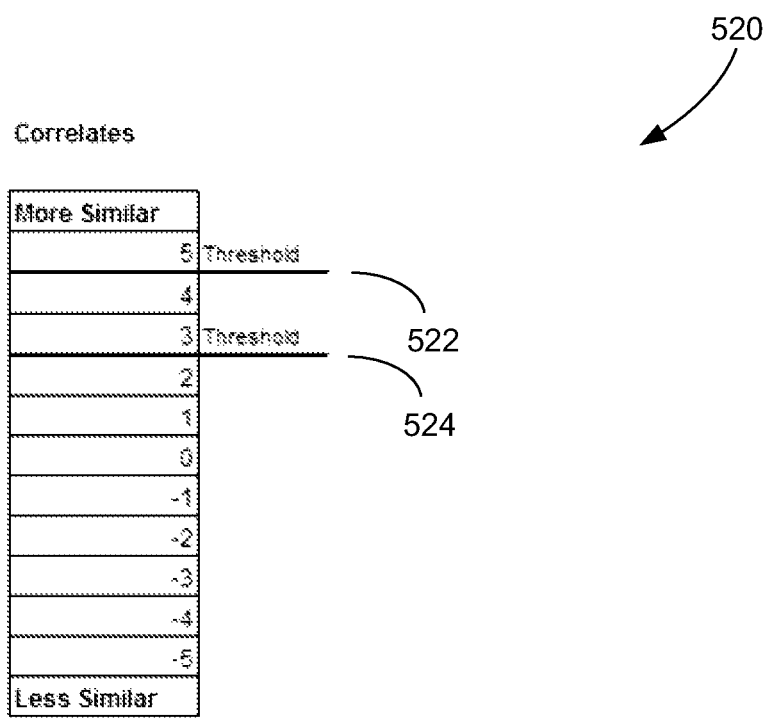
FIG. 5B illustrates an example similarity score threshold matrix depicted in tabular form.
FIG. 5C illustrates an example mood list depicting various example mood categories.

FIG. 5B illustrates an example section of a similarity score threshold matrix table 520. In the example, the table 520 is shown by way of example to have two example thresholds 522, 524. In an example embodiment, one of the thresholds may be set by the application while the other threshold may be a user preference. The user preference threshold may be set by the user or may be automatically derived from how an application is used by the user. In other embodiments, there may be only one threshold in table 520, and in other embodiments, there may be a plurality of thresholds, each set for a different user.

As an example determination of similarity of mood categories, using table 500 of FIG. 5A, mood category M1 cross-referenced with mood category M3 results in a comparative value of "1". When compared to the thresholds depicted in table 520 of FIG. 5B, these two categories may be considered "similar" and does not exceed either threshold 522 or 524. As another example, cross-referencing mood category M1 with M(n–1) results in a comparative value of "3". In table 520 of FIG. 5B, "3" exceeds the threshold 524, which may correspond with one user's preferred similarity threshold or an automatically preset similarity threshold. It should be noted that any scale may be used by the similarity score threshold matrix of table 520 to correspond with the correlates matrix in table 500.

FIG. 5C illustrates a mood list 530, of an example embodiment, depicting various mood categories. In the example embodiment, a more descriptive list of mood categories is translated into shorter lists of mood categories. The shorter lists may then be applied by processing system 110 of FIGS. 1A and 1B and will require less memory allocation and processing power at the processing system 110.

Figure 6:
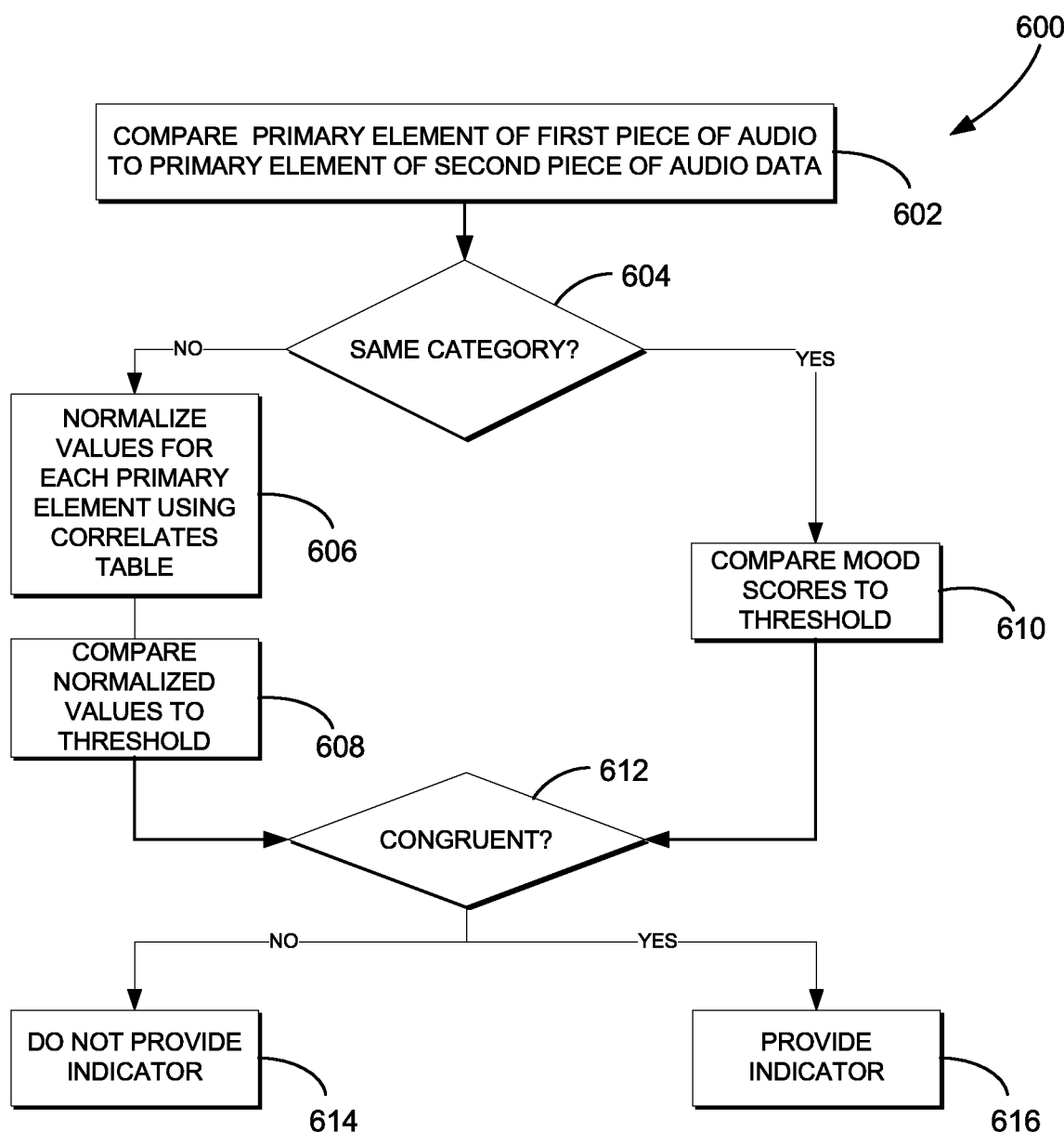
FIG. 6 illustrates a flow diagram of a method, in accordance with an example embodiment, for comparing the primary elements of two pieces of audio data to determine mood congruency.

FIG. 6 illustrates a flow diagram of a method 600, in accordance with an example embodiment, for comparing the primary elements of two pieces of audio data and thereby determining mood congruency. The primary element of a piece of audio data may include the mood category with the highest score for the mood profile associated with that piece of audio data. Each primary element may thus identify the predominant mood in an associated audio recording. The method 600 provides additional detail to the example method 410 of FIG. 4B.

At block 602, the method 600 compares the primary element of a first piece of audio data to the primary element of a second piece of audio data. At decision block 604, the method 600 determines whether the two pieces of audio data have the same mood category. If the mood categories are not the same, then at block 606, the method 600 normalizes the score for each primary element using a correlates matrix, such as, for example, the table 500 depicted in FIG. 5A. In an embodiment, using the correlates matrix of table 500, the mood category of the primary element of the first piece of audio data is correlated with the mood category of the primary element of the second piece of audio data to produce the normalized value for the first piece of audio data. For example, if the mood category of the first primary element of the first recording (e.g. seed recording) is M1 and if the mood category of the second primary element of the second playlist recording is M2, these two mood categories (M1, M2) are cross-referenced, using the correlates matrix, to find a comparative value. This comparative value is then used to calculate a normalized value associated with the first primary element. In an example embodiment, the normalized value may simply result from a multiplication of the primary element score by the comparative value to arrive at the normalized value for that primary element as shown above. An example equation of the normalized value is as follows:

First Normalized Value=(Mood Score of Primary Element of First Recording)*(Comparative value from correlates matrix($M1,M2$))

The mood category of the primary element of the second piece of audio data (e.g., second recording) is self-correlated (i.e. M2, M2) to find the comparative value using the correlates matrix, and produce the normalized value for the second piece of audio data. An example equation for the second normalized value is below.

Second Normalized Value=(Mood Score of Primary Element of Second Recording)*(Comparative Value from correlates matrix($M2,M2$))

At block 608, the method 600 then compares the normalized value of the first element to the normalized value of the second element to determine congruency at decision block 612. In some example embodiments, the comparison of the normalized values results in a similarity score which is then compared to a threshold. A similarity score summarizes a relationship of normalized values (e.g., in some embodiments, by a calculation using the normalized values) in order to compare the relationship of the normalized values to a threshold value. In some example embodiments, this threshold value may be set by a user using a graphical interface. In other example embodiments, the method 600 uses the two non-identical mood categories to look up the respective comparison value using table 500 of FIG. 5A or table 510 of FIG. 5B, and determines the similarity between the mood categories based on the thresholds set in the similarity score threshold matrix as depicted in table 520 of FIG. 5C. In any of these embodiments, if the comparison exceeds the threshold setting, then at block 616, the method 600 provides an indicator. If at block 612, the threshold is not exceeded, then at block 614, the method 600 does not provide an indicator. In other example embodiments, the top "N" most similar recordings in the playlist are considered congruent regardless of the threshold set, where "N" is an integer value set either by the application or by a user.

Returning to decision block 604, if the two primary mood categories are the same, then the method 600 continues to block 610 to compare the two mood scores to each other and to a threshold value to determine congruency at block 612. If the comparison of scores from each primary element exceeds the threshold value, then an indicator is provided at block 616 but if the threshold value is not exceeded, then method 600 continues to block 614 where an indicator is not provided. In some example embodiments, if the primary mood categories are the same, no additional calculations are performed and the recordings are deemed congruent at decision block 612, and the method provides an indicator at block 616. In an example embodiment, the indicator may suggest the second piece of audio data to an application such as a media recommender, player or a playlist generator. Ultimately, the indicator may be used to retrieve the second piece of audio data from a storage location for use by an application. In an example embodiment, the indicator may request an application to search through a database of audio data to determine additional pieces of audio data having congruent moods to the first piece of audio data. As one example, the indicator may search through a local storage device for audio data (e.g., recordings of musical compositions) having primary moods congruent to the first piece of audio data. In other embodiments, the indicator may signal to continue with or to terminate additional mood congruency determinations.

Figure 7A:
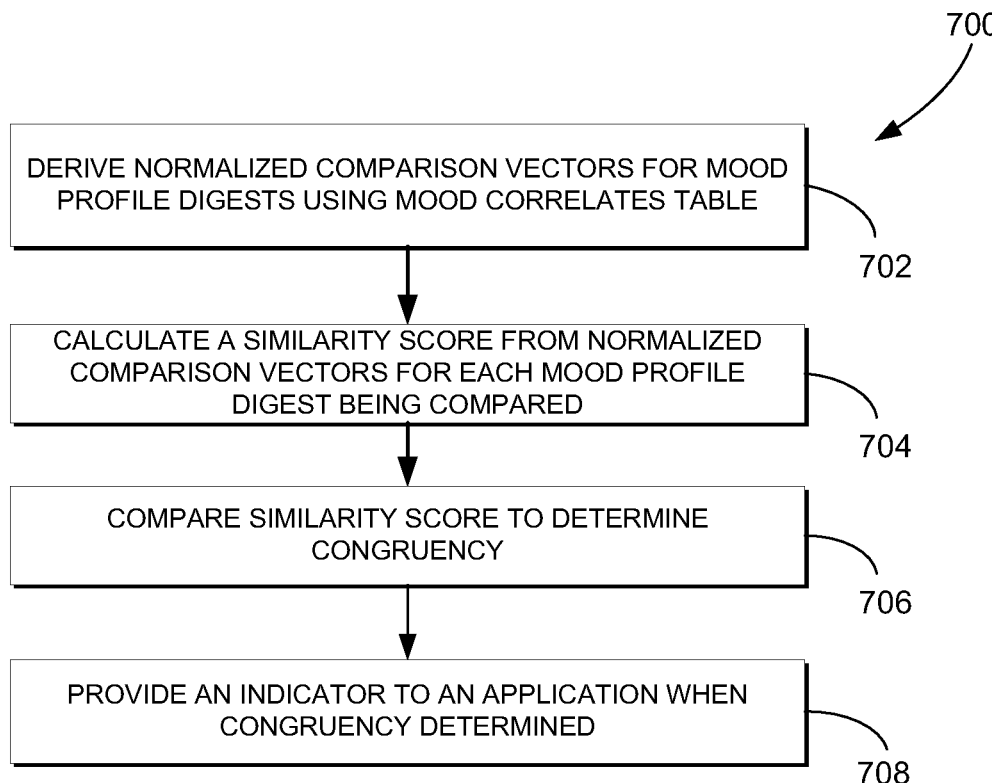
FIG. 7A illustrates a flow diagram of a method, in accordance with an example embodiment, for producing an indicator based on a comparison of mood profile digests.

FIG. 7A illustrates a flow diagram, in accordance with an example embodiment, of a method 700 for producing an indicator based on a comparison of mood profile digests. At block 702, the method 700 derives a normalized comparison vector for the mood profile digest for each piece of audio data (e.g., each recording in a music library). The method 700 employs a correlates matrix such as the table 500 depicted in FIG. 5A to produce a normalized comparison vector from the mood profile digest of each piece of audio data. In this example embodiment, the mood profile digest used by method 700 consists of 'N' elements having the top 'N' mood scores from the mood profile of each piece of audio data. In the example, the method 700, at block 702, first determines a normalized vector space wherein the two mood profile digests may be compared. Each mood profile digest is then mapped into this vector space using comparison values in a correlates matrix similar to table 500 of FIG. 5A, to produce a normalized comparison vector for each mood profile digest being compared.

In an example embodiment, the dimensions of the normalized vector space are identical to the mood categories of the mood profile digest of the first piece of audio data. Determining a length-N normalized comparison vector "$A_{comp}$" for the first mood profile digest "A", of length M, may then be calculated by the following equation:

$$A_{comp}[n] = \sum_{m=1}^{M} A_{score}[m] \times C(A_{category}[m], A_{category}[n])$$

Where $A_{comp}[n]$ is the $n^{th}$ element of the normalized comparison vector $A_{comp}$, $A_{score}[m]$ is the score of the $m^{th}$ element of mood profile digest A, $A_{category}[m]$ is the mood category of the $m^{th}$ element of mood profile digest A, and C(x,y) is the comparison value between mood categories x and y as given in a mood correlates table such as the one shown in Table 500 in FIG. 5A. A normalized comparison vector "$B_{comp}$" for the second mood profile digest "B" may then be calculated by the following equation:

$$B_{comp}[n] = \sum_{m=1}^{M} B_{score}[m] \times C(B_{category}[m], A_{category}[n])$$

Where $B_{comp}[n]$ is the $n^{th}$ element of the normalized comparison vector $B_{comp}$, $B_{score}[m]$ is the score of the $m^{th}$ element of mood profile digest B, $B_{category}[m]$ is the mood category of the $m^{th}$ element of mood profile digest B, and C(x,y) is the comparison value between mood categories x and y as given in a mood correlates table.

In other embodiments, the dimensions of the normalized vector space may be non-identical to the mood categories of any of the mood profiles being compared, though mapping a mood profile digest to that normalized vector space is still achievable using a procedure similar to the one described above. The generalized procedure can be described by the following equation:

$$A_{comp}[n] = \sum_{m=1}^{M} A_{score}[m] \times C(A_{category}[m], V_{category}[n])$$

Where $V_{category}$ is a length N array of mood categories that define the dimensions of the normalized comparison vector space.

At block 704, the method 700 calculates a similarity score between normalized comparison vectors using vector metric and similarity methods known to persons having ordinary skill in the art. In some example embodiments, the similarity score is derived by calculating the Euclidean Distance, also known as the Geometric Distance, between two normalized comparison vectors. In another example embodiment, the similarity score is computed using a Cosine Similarity Function, which takes the inner product of two normalized comparison vectors and normalizes them to the product of the magnitudes of both vectors. In another example embodiment, the similarity score is derived by computing the Pearson Correlation Coefficient for the two normalized comparison vectors. In yet another example embodiment, the similarity score is derived by computing the Kullback Liebler divergence between the two normalized comparison vectors.

At block 706, the method 700 uses the similarity scores to determine the congruency. A comparison of the similarity score to a threshold or range determines mood congruency between a first mood profile digest and a second mood profile digest. In an example embodiment, the similarity score is compared to a threshold to determine mood congruency. In another example embodiment, the method 700 may determine a congruency between the two pieces of audio data if both similarity scores fall within a predetermined range having an upper limit and a lower limit. In this example, the range may be determined by using the primary element mood category of the first piece of audio data to look up the range in a table. In some embodiments, the comparison of similarity scores at block 706 may comprise of additional calculations between normalized comparison vectors of the two mood profile digests, the result of which may be compared to produce the indicator. In another example embodiment, the recordings having the top "N" highest resulting similarity scores are considered congruent to recording A, where "N" in an integer greater than 1 and may be set by the application or a user.

At block 708, the method 700 provides an indicator to an application when a mood congruency is determined between the first and second pieces of audio data (e.g., two recordings). In an example embodiment, the indicator may be related to the second piece of audio data and may be used by an application to access, retrieve, play, and/or suggest the second piece of audio data for a user. Thus, the method 700 may be used to provide music recommendations. In another example embodiment, the indicator may be used by an application to create a playlist of pieces of audio data (e.g. recordings of musical compositions) having moods congruent to the first and second pieces of audio data. In some embodiments, the indicator may be provided after determining congruency between other characteristics of first and second pieces of audio data as is discussed in reference to FIG. 7B and method 720 below.

It is to be noted that any number of mood elements may be used in method 700, and may be defined by the application setting a mood profile digest. In an example embodiment, the granularity of the mood comparison (e.g., number of mood elements in a mood profile digest to be compared) may be bound by hardware limitations of a processing system (for example, available processing power and/or memory allocation), may be set to a user preference, or may be determined by any combination thereof. Accordingly, in a client-server arrangement where the client is a mobile media device that may have relatively restricted processing capabilities (e.g., a portable media player) only a limited number of mood categories (e.g., 10) may be communicated to the mobile media device. However, processing at the server may involve a much larger number of categories (e.g., 100 categories). In an example embodiment, the congruency relationship (or lack of congruency) between the first and second pieces of audio data may be stored and accessible or retrievable by an application when the application is requested to determine congruency between the same two pieces of audio data at a later point in time.

In some example embodiments, method 700 may compare user preferences in lieu of elements of a first piece of audio data. For example, the user may be able to create a mood preference profile using a graphical user interface allowing the user to input values for various mood categories based on personal preferences or the mood preference profile may be assembled automatically by analyzing the content of user music collections or music listening or other activity history. The elements of the user-generated mood preference profile (potentially limited by the mood profile digest of an application) may then be compared to elements of mood profiles of audio data (also similarly limited by the mood profile digest of the application) to determine a mood congruency and to suggest a mood-congruent piece of audio data. In other example embodiments a mood preference profile may be generated automatically based on, for example, audio data (e.g., one or more recordings) consistently accessed by a user then used to compare and determine congruency with mood profiles of audio data.

Figure 7B:
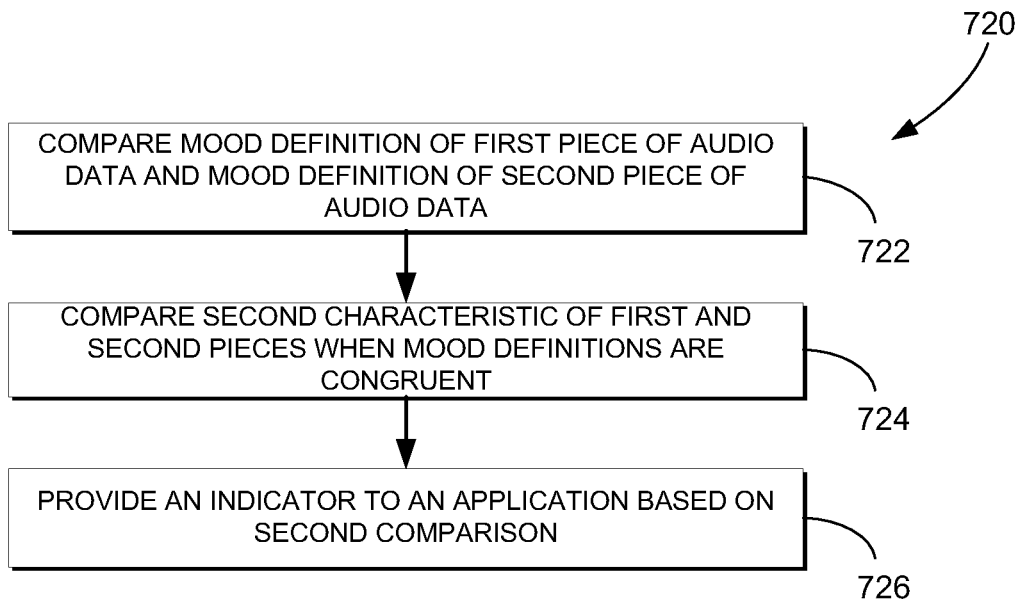
FIG. 7B illustrates a flow diagram of a method, in accordance with an example embodiment, for comparing mood profile digests of two pieces of audio data, and upon determining a mood congruency, comparing a second characteristic of the two pieces of audio data.

FIG. 7B illustrates a flow diagram of a method 720, in accordance with an example embodiment, for comparing the mood profile digests of two pieces of audio data, and upon determining a mood congruency, comparing a second characteristic of the two pieces of audio data. At block 722, the method 720 compares the mood of a first piece of audio data to the mood of a second piece of audio data (e.g., comparing the moods of two music recordings). At block 722, in an example embodiment, the method 720 may employ method 700 of FIG. 7A to determine mood congruency between the first and second pieces of audio data. If block 722 the moods of the first and second pieces of audio data are considered substantially similar the method 720, at block 724 compares a second characteristic of the first and second pieces of audio data. In some embodiments, at block 724, the method 720 may compare one or more additional characteristics in addition to mood and the second characteristic. In example embodiments, at block 724, the method 720 may compare the genre, origin, tempo, era, or any other characteristic of the audio data to determine a congruency of these characteristics. In some example embodiments, the method 720 may employ a method similar to the method 700 of FIG. 7A as described above, when determining congruency between the first and second pieces of audio data across the other characteristics. At block 726, the method 720 provides an indicator to an application based on results of the mood congruency and the second comparison. As described above in reference to the method 700 at block 708 (of FIG. 7A as described above), similarly, the resulting indicator at block 726 may be employed for a variety of tasks by an application.

Figure 8:
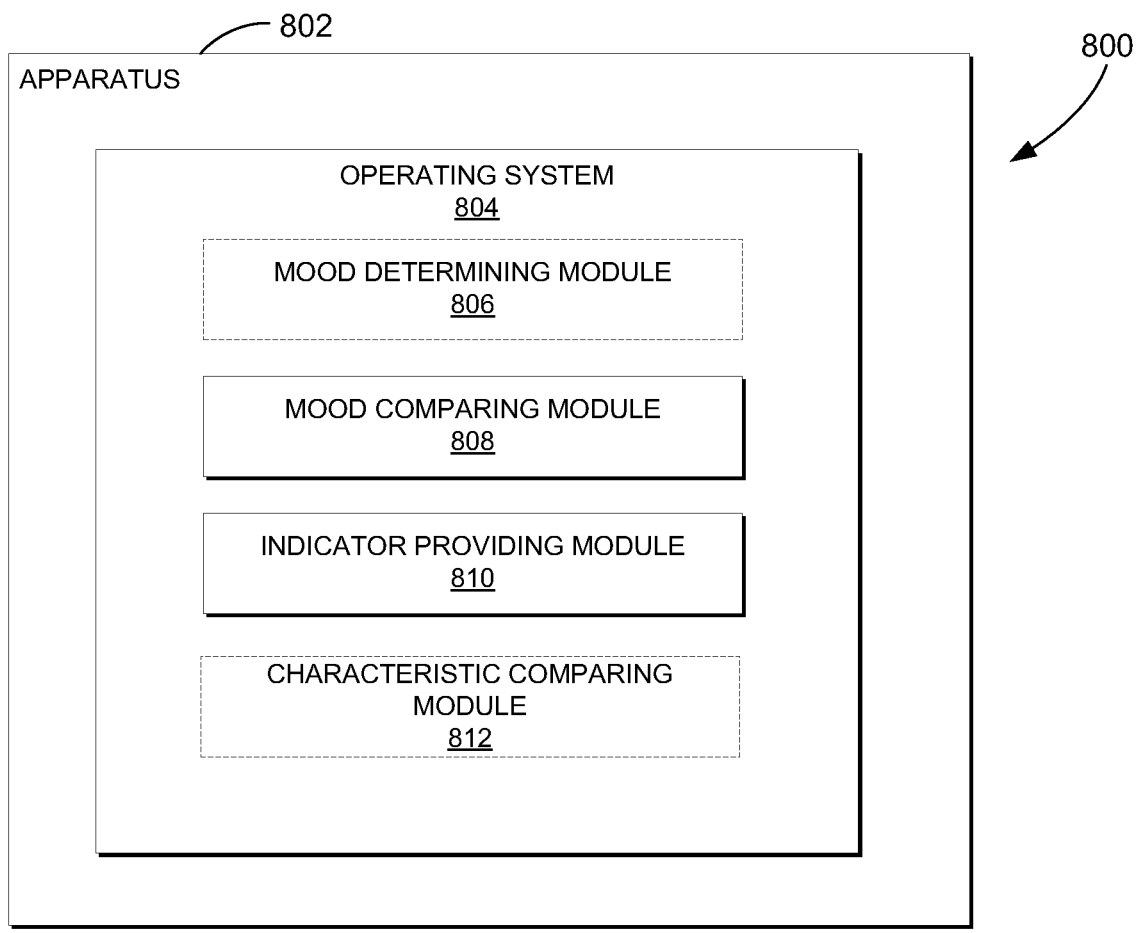
FIG. 8 is a block diagram of modules of an apparatus, in accordance with an example embodiment, configured to provide an indicator to an application when the mood congruency exceeds a threshold.

FIG. 8 depicts a block diagram of various modules of an apparatus 802, in accordance with an example embodiment, configured to provide an indicator to an application when the mood congruency exceeds a threshold. In some example embodiments, apparatus 802 may be configured to include all or some of the modules of apparatus 302 of FIG. 3 in order to determine a mood profile of audio data 112. For example, as shown in FIG. 8, mood determining module 806 (shown with a dashed outline) may be included in the configuration of apparatus 802 to determine the mood of one or more pieces of audio data in a manner similar to the modules of apparatus 302 as described above.

The apparatus 802 is shown to include an operating system 804 facilitating the operation of a plurality of modules. The plurality of modules is shown to include a mood determining module 806, a mood comparing module 808, an indicator providing module 810, and a characteristic comparing module 812. The mood determining module 806 is configured to determine the mood profile of one or more pieces of audio data, as described above in reference to FIGS. 2A, 2B and 3.

The mood comparing module 808 is configured to compare the mood elements of two or more pieces of audio data. In an example embodiment, the method 700 of FIG. 7A may be employed in comparing the mood elements of the mood profile digest.

The indicator providing module 810 provides an indicator when two pieces of audio data are determined mood congruent by the mood comparing module 806. In some example embodiments, the indicator providing module 810 submits the indicator to a variety of other modules capable of using the indicator to perform various tasks, such as, for example, accessing, retrieving, playing, and/or suggesting a piece of audio data. In one example embodiment, the indicator providing module 810 may provide the indicator to the characteristic comparing module 812, as described below, before performing an additional characteristic comparison.

In some example embodiments, the apparatus 802 may additionally comprise a characteristic comparing module 812. The characteristic comparing module 812 compares at least one characteristic in addition to a mood profile digest of the two pieces of audio data. In an example embodiment, the characteristic comparing module 812 may be employed to determine a congruency between two pieces of audio data, the result of which may be submitted to indicator providing module 810 to determine whether an indicator should be provided to an application based on the result of the one or more characteristic comparisons.

It should be appreciated that in other embodiments, the apparatus 802 may include fewer or more modules apart from those shown in FIG. 8. For example, the mood comparing module 806 and the indictor providing module 808 may be combined into an integrated module configured to compare moods and provide an indicator based on the comparison between two pieces of audio data. The modules 806, 808, 810 and 812 may be in the form of software that is processed by a processor. In another example embodiment, the modules 806, 808, 810, and 812 may be in the form of one or more logic blocks included in a programmable logic device (e.g., a field-programmable gate array). The described modules 806, 808, 810, and 812 may be adapted, and/or additional structures may be provided, to provide alternative or additional functionalities beyond those specifically discussed in reference to FIG. 8. The modifications or additions to the structures described in relation to FIG. 8 to implement these alternative or additional functionalities will be implementable by those skilled in the art, and having the benefit of the present specification and teachings.

As mentioned above, the example embodiments and configurations above relate to audio data (e.g. a song recording) to illustrate one of many forms of media data wherein mood profiles may be determined and further used to match, sort, suggest, and generally manage media recordings. One knowledgeable in the art would be capable of adapting the methodologies above relating to audio recordings to other forms of media recordings such as, but not limited to, digital photographs, images, and video recordings. Some example embodiments may employ color histograms when determining the mood profiles of an image or video scene (e.g., wherein bright colors may be translated as "upbeat" and "happy" moods and dark colors may be translated as "ominous", "mysterious", "dreadful", and "depressing" moods). Other example embodiments may incorporate other visual features when determining a mood profile of images and video recordings include, but not limited to, contrast, hue, texture, luminance, color saturation, among various other characteristics. These visual features may be used to derive a mood profile by using supervised classification techniques similar to method 200 shown in FIG. 2A. In other embodiments, face detection and emotion extraction may assess the general emotion of the subject of an image or video recording, and from this information, a mood profile for an image or video recording may be derived.

Upon determining a mood profile for a particular media recording, the same or similar mood correlates tables along with the methodologies and determinations described above in relation to audio data, may then be employed when performing a comparison and congruency determination between mood profiles of these other forms of media recordings.

Figure 9:
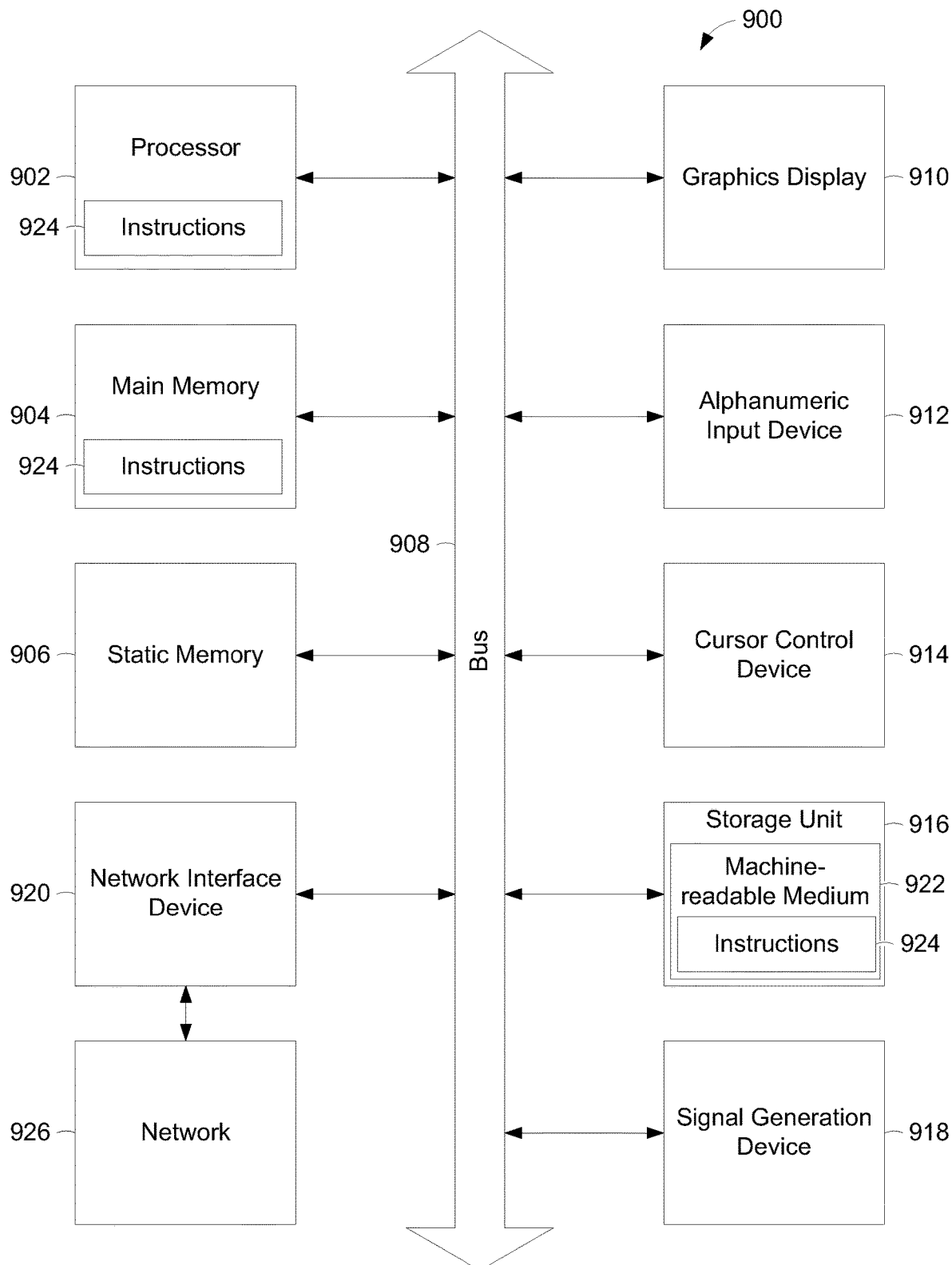
FIG. 9 depicts a simplified block diagram of a machine in the example form of a processing system, within which a set of instructions, for causing the machine to perform any one or more of the methodologies discussed herein, may be executed.

The example embodiments provided and discussed herein are in reference to a processing system, such as the example device depicted in FIG. 9, and discussed in reference to such figure. Additionally, the provided example is in the context of an audio data recording and may be recorded in either analog or digital form. This audio recording may be a discrete recording such as a song or other music, or may be associated with another media, such as video (for example, digital video having an associated audio recording). Also, the term "audio data" is intended to refer to information that generates or represents music or other audible media. Thus, the term "audio data" is intended to include an analog or digital representation of an audio output, whether or not that representation is actually rendered in a form perceivable by a human listener.

As discussed in reference to FIG. 9, one example of such a processing system has a display, as well as a communication interface. As is known to those skilled in the art, the communication interface may be through various input devices, such as one or more of a mouse, keyboard, trackball, tablet, etc., or maybe through the display itself, such as through any of a number of types of "touch screen" interfaces. Additionally, a keyboard may either be a conventional electromechanical keyboard, or may be a virtual keyboard (for example, a keyboard presented on the display for direct input through the display surface) or any other keyboard capable of transmitting an input.

FIG. 9 depicts a simplified block diagram of a machine in the example form of a processing system, such as a processing system 110 as depicted in FIG. 1A, within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The example processing system 900 includes a processor 902 (e.g., a central processing unit (CPU), a graphics processing unit (GPU) or both), a main system memory 904 and a static memory 906, which communicate with each other via bus 908. The processing system 900 may further include a video display unit 910 (e.g., a plasma display, a Liquid Crystal Display (LCD), Organic Light Emitting Diode (OLED) display, Thin Film Transistor (TFT) display, or a cathode ray tube (CRT)). The processing system 900 also includes an optical media drive 904, a user interface (UI) navigation device 914 (e.g., a mouse), a disk drive unit 916, a signal generation device 918 (e.g., a speaker), an optical media drive 928, and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main system memory 904 and/or within the processor 902 during execution thereof by processing system 900, with the main system memory 904 and the processor 902 also constituting machine-readable, tangible media. The software 924 may further be transmitted or received over the network 926 via the network interface device 920 utilizing any one of a number of well-known transfer protocols (e.g., Hypertext Transfer Protocol (HTTP)).

While the machine-readable medium 922 is shown in an example embodiment to be a single medium, the term "machine-readable medium" should be taken to include a single medium or multiple media (e.g., a centralized or distributed database, and one or more instances of memory which may be or include caches) that store the one or more sets of instructions. The term "machine-readable medium" shall also be taken to include any medium that is capable of storing a set of instructions for execution by the machine and that cause the machine to perform any one or more of the methodologies of the present application, or that is capable of storing, either permanently or temporarily (such as in execution of a set of instructions) data structures utilized by or associated with such a set of instructions. The term "machine-readable medium" shall accordingly be taken to include, but not be limited to, solid-state memories, optical and magnetic media, and other structures facilitating reading of data stored or otherwise retained thereon.

Many modifications and variations may be made to the techniques and structures described and illustrated herein without departing from the scope of the present invention. For example, as referenced above many types of variations might be implemented to guide a user through a series of input frames, such as the depicted data screens. As one example, completion of input of variables in one input frame might cause automatic inactivation of that input frame and activation of a subsequent input frame. Additionally, although specification has addressed primarily the use of visual cues to guide a user through the process of providing the necessary variables, these visual cues could be used in conjunction with, for example, audible tones. Accordingly, the present specification must be understood to provide examples to illustrate the present inventive concepts and to enable others to make and use those inventive concepts.

In this description, references to "one embodiment" or "an embodiment," or to "one example" or "an example" mean that the feature being referred to is, or may be, included in at least one embodiment or example. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims. For the purposes of this specification, a "processor-based system" or "processing system" includes a system using one or more processors, microcontrollers and/or digital signal processors having the capability of running a "program." A "program" is a set of executable machine code instructions, and as used herein, includes user-level applications as well as system-directed applications or daemons. Processing systems include communication and electronic devices such as cell phones, music and multi-media players, and Personal Digital Assistants (PDA); as well as computers, or "computing devices" of all forms (desktops, laptops, servers, palmtops, workstations, etc.). The various embodiments described herein are not necessarily mutually exclusive, as some embodiments can be combined with one or more other embodiments to form new embodiments. This detailed description is, therefore, not to be taken in a limiting sense.

Certain systems, apparatus or processes are described herein as being implemented in or through use of one or more "modules." A "module" as used herein is an apparatus configured to perform identified functionality through software, firmware, hardware, or any combination thereof. When the functionality of a module is performed in any part through software or firmware, the module includes at least one machine-readable medium bearing instructions that when executed by one or more processors perform that portion of the functionality implemented in software or firmware. The modules may be regarded as being communicatively coupled to one another to at least the degree needed to implement the described functionalities.

The invention claimed is:

1. A method comprising:
    accessing, by a processor, from a database, a score that represents a degree of congruency between a first mood vector that describes first media data and a second mood vector that describes second media data, wherein the score is generated based on (i) a first value that the first mood vector associates with a first mood, (ii) a second value that the second mood vector associates with a second mood, and (iii) a degree of congruency between the first mood and the second mood;
    based on the score, comparing, by the processor, a first characteristic of the first media data, other than the first mood, with a second characteristic of the second media data, other than the second mood; and
    based at least in part on an output of the comparing, providing an indicator to a module.

2. The method of claim 1, wherein providing the indicator to the module comprises displaying a selectable indication of the second media data on a user interface.

3. The method of claim 1, wherein providing the indicator to the module comprises accessing the second media data from data storage.

4. The method of claim 1, wherein providing the indicator to the module comprises playing the second media data using a signal generation device.

5. The method of claim 1, wherein the first characteristic and the second characteristic comprise at least one of genre, origin, tempo, or era of the first media data and the second media data, respectively.

6. The method of claim 1, wherein the first characteristic and the second characteristic comprise first and second metadata associated with the first media data and the second media data, respectively.

7. The method of claim 1, wherein providing the indicator to the module comprises adding the second media data to a playlist.

8. A non-transitory machine-readable storage medium comprising instructions that, when executed by one or more processors of a machine, cause the machine to perform operations comprising:
    accessing, by a processor, from a database, a score that represents a degree of congruency between a first mood vector that describes first media data and a second mood vector that describes second media data, wherein the score is generated based on (i) a first value that the first mood vector associates with a first mood, (ii) a second value that the second mood vector associates with a second mood, and (iii) a degree of congruency between the first mood and the second mood;

based on the score, comparing, by the processor, a first characteristic of the first media data, other than the first mood, with a second characteristic of the second media data, other than the second mood; and based at least in part on an output of the comparing, providing an indicator to a module.

9. The non-transitory machine-readable storage medium of claim 8, wherein providing the indicator to the module comprises displaying a selectable indication of the second media data on a user interface.

10. The non-transitory machine-readable storage medium of claim 8, wherein providing the indicator to the module comprises accessing the second media data from data storage.

11. The non-transitory machine-readable storage medium of claim 8, wherein providing the indicator to the module comprises playing the second media data using a signal generation device.

12. The non-transitory machine-readable storage medium of claim 8, wherein the first characteristic and the second characteristic comprise at least one of genre, origin, tempo, or era of the first media data and the second media data, respectively.

13. The non-transitory machine-readable storage medium of claim 8, wherein the first characteristic and the second characteristic comprise first and second metadata associated with the first media data and the second media data, respectively.

14. The non-transitory machine-readable storage medium of claim 8, wherein providing the indicator to the module comprises adding the second media data to a playlist.

15. A system comprising:
a memory that stores instructions;
a database;
one or more processors configured by the instructions to perform operations comprising:

accessing, by a processor, from a database, a score that represents a degree of congruency between a first mood vector that describes first media data and a second mood vector that describes second media data, wherein the score is generated based on (i) a first value that the first mood vector associates with a first mood, (ii) a second value that the second mood vector associates with a second mood, and (iii) a degree of congruency between the first mood and the second mood;

based on the score, comparing, by the processor, a first characteristic of the first media data, other than the first mood, with a second characteristic of the second media data, other than the second mood; and based at least in part on an output of the comparing, providing an indicator to a module.

16. The system of claim 15, wherein providing the indicator to the module comprises displaying a selectable indication of the second media data on a user interface.

17. The system of claim 15, wherein providing the indicator to the module comprises accessing the second media data from data storage.

18. The system of claim 15, wherein providing the indicator to the module comprises playing the second media data using a signal generation device.

19. The system of claim 15, wherein the first characteristic and the second characteristic comprise at least one of genre, origin, tempo, or era of the first media data and the second media data, respectively.

20. The system of claim 15, wherein the first characteristic and the second characteristic comprise first and second metadata associated with the first media data and the second media data, respectively.

* * * * *